United States Patent [19]
Pressman et al.
[11] 3,780,376
[45] Dec. 18, 1973

[54] METHOD AND APPARATUS FOR SINGLE AND MULTICOPY CRT COMPUTER PRINT-OUT

[75] Inventors: Gerald L. Pressman, San Jose; Thomas D. Kittredge, South San Francisco, both of Calif.

[73] Assignee: Electroprint, Inc., Palo Alto, Calif.

[22] Filed: July 28, 1971

[21] Appl. No.: 167,052

Related U.S. Application Data

[62] Division of Ser. No. 776,146, Nov. 15, 1968, Pat. No. 3,647,291.

[52] U.S. Cl. ........ 346/74 CR, 118/637, 346/74 EB, 346/74 P, 355/3

[51] Int. Cl. .......... G03g 15/00

[58] Field of Search .......... 346/74 CR, 74 ES, 346/74 EB, 74 P; 355/3; 118/637

[56] References Cited

UNITED STATES PATENTS

| | | | |
|---|---|---|---|
| 3,582,206 | 6/1971 | Burdige | 346/74 ES |
| 3,132,206 | 5/1964 | King | 346/74 P |
| 3,541,956 | 11/1970 | Falchero | 346/74 ES |
| 3,547,029 | 12/1970 | Levine | 346/74 ES |

*Primary Examiner*—James W. Moffitt
*Assistant Examiner*—Stuart Hecker
*Attorney*—Wilfred G. Caldwell

[57] ABSTRACT

The invention relates to apparatus and methods for constituting or reproducing images through the use of a multi-layered screen consisting of an array of apertures from computer information sources. A propulsion field directs charged particles through the screen to a receiving medium preferably spaced at a distance from the screen. Charge distribution on the screen controls the flow of particles through the apertures, some of which are in effect blocked, partially blocked, unblocked, and enhanced, depending on the local charge level. Thus, it is possible to produce patterns of varying tone without contact with the printed or effected substrate. The computer output information may be transferred to the screen optically as from the face of a cathode ray tube or electrically from a direct reading cathode ray tube to establish the charge distribution. The former imaging station utilizes a photoelectric insulative layer overlying a conductive layer for the screen whereas the latter employs a non-light sensitive insulative layer overlying the conductive layer.

11 Claims, 68 Drawing Figures

PATENTED DEC 18 1973 3,780,376

SHEET 04 OF 22

| | POSITIVE PRINT | | | | NEGATIVE PRINT | | | |
|---|---|---|---|---|---|---|---|---|
| | POS. PART | | NEG. PART | | POS. PART | | NEG. PART | |
| | A | C | A | C | B | C | B | C |
| $E_C$ | + | + | − | − | S.C. | + | S.C. | − |
| $E_E$ | NONE | − | NONE | + | + | − | − | + |

FIG. 40

| VOLTAGE | POSITIVE PARTICLES | | NEGATIVE PARTICLES | |
|---|---|---|---|---|
| | NEG. PRINTING | POS. PRINTING | NEG. PRINTING | POS. PRINTING |
| $E_C$ | + | − | − | + |
| $E_E$ | + | − | − | + |

FIG. 16a

METHOD AND APPARATUS FOR SINGLE AND MULTICOPY CRT COMPUTER PRINT-OUT

This application is a divisional application of U.S. Ser. No. 776,146, filed Nov. 15, 1968, by the same inventors entitled: "Apparatus for Aperture Controlled Electrostatic Image Reproduction or Constitution," now U. S. Pat. No. 3,647,291 issued Mar. 7, 1972.

This invention relates to aperture controlled electrostatic reproduction processes and methods which employ a multi-layer screen consisting of an array of apertures and comprising at least a conductive layer and a superimposed insulative layer to enable the deployment of opposite electrostatic charges on opposite surfaces of the insulative layer, thus providing a double-layer of charge which produces fringing fields within the apertures, The screen may be precharged to produce a uniform double-layer of charge which is then modified in accordance with an image to produce diminished, zero, and reversed charge areas which produce blocking, non-blocking, and enhancing fringing fields controlling the apertures in accordance with the imabe to be produced. Alternately, charged images of the required form may be established on previously uncharged screens. The conductive screen layer is maintained at a potential usually during charging and printing, and a propulsion field is provided for directing charged printing particles toward the screen. The particles will not pass or pass in fewer numbers through apertures which lie in areas of the screen containing charges so oriented as to produce fringing fields within the aperture which oppose the propulsion field. Such apertures are termed blocked or partly blocked. The particles will pass through apertures which lie in uncharged areas of the screen or which lie in areas of the screen which contain charges whose fringing fields are oriented so as to assist the passage of particles through the apertures. The latter apertures are said to contain enhancing fields, and the charged particles pass through these apertures in greater numbers.

This process thus uses a charge pattern which modulates the flow of particles, such as toner, through the screen to a receiving medium, via preferably an air gap, for subsequent fixing thereon, if necessary.

The insulator layer of the screen may comprise a photoconductive type which may be electrically charged. Alternatively, if the selected insulator screen has a low dielectric strength, a thin undercoating of a high dielectric material, not necessarily photoconductive, is employed between the photoconductive layer and the conductive layer. Similarly, a thin overcoating of high resistivity material may be employed to provide a charge carrier for photoconductors with poor surface resistivity. When employing photoelectric materials that cannot be deposited in heavy layers, the insulating layer may be comprised of any good insulating material which will accept the sensitive material as a thin deposit. Thus, a thin layer photosensitive material may be coated over the screen comprised of an insulator and conductive layer.

Other materials which may be used as the insulator layers are photo emissive material, polyester films, epoxy, photoresists, fused quartz, or combinations thereof. In addition, the conductor backing itself may be deposited on the insulator, or a separate insulator layer, not taking part directly in the electrostatic process, may be used to support both the conductor and insulator layers.

The present invention differs from the known stencil type inventions, such as disclosed in U.S. Pat. No. 3,061,068 to C. O. Childress, et al., issued Mar. 16, 1963 and entitled Electrostatic Printing System, for the reason that the screen employed in this patent must be in the form of a permanent stencil having openings where printing is desired and through which the particles pass to the print receiving material. However, these stencils are not useful for producing more than one shape of image without resorting to stencil forming processes to change the image. Such stencil forming processes may be similar to the production of a silk-screen image. In the present invention, the screen is instantly reusable and there is no physical stencil required.

For this reason the present invention may be embodied in various apparatus and methods. For example, it may comprise an office copy machine, a printing plate and/or method, a camera or photographic arrangement, an enlarger or printing device for slides, transparencies, negatives or positives, a typewriter, a computer or facsimile printout arrangement, or in fact, it may be employed wherever modulated control of charged particles is inherent or desirable. or desirable. It is broadly applicable to reproduction in black and white or color, and is even applicable to television.

Thus, it may be appreciated that the pattern to be reproduced, developed or handled may comprise any of shapes, distributions, light or other radiation including electro-magnetic radiation, configurations, surfaces, or other things. While a preferred use may be reproduction using dry toner particles, nevertheless aerosols, ink droplets or other chargeable particles may be employed. For example, an electrostatic latent image may be configurated or reproduced. Ions may be laid down in a pattern or distribution. Other particles, such as, oleophilic or hydrophilic, or adhesive, or chemically reactive, transparent, opaque, colorless or color may also be employed herein. Therefore, the principles of the invention herein set forth have very broad application. The present invention actually electrostatically modulates the apertures of the screen, through the provision of the enhanced double layer charge, which is modified in accordance with the image, be it from film, landscape or other source, to control the flow of charged particles through the screen to the receiving material or object.

In the composite screen structure of the present invention, the conductive layer, at fixed potential performs two novel functions. In the first place, it enables the insulative layer to be charged oppositely, thereby developing the fringing fields (either blocking or enhancing) within the apertures of the screen, which fields are oriented in accordance with the image pattern. It also enables the maintenance of the enhancing and blocking fields during projection of the charged marking material, and the charges of the particles which do not pass through the grid or screen are rendered substantially ineffective as the conductive layer shields the fringing fields from the effects of those charges.

The conductor layer may also be used to establish a uniform field between the screen and receiving material, if this is desired. Depending on the charge level of the toner particles, the conductive layer does not have to face the toner supply.

For these reasons, the composite screen structure is preferred, but a less expensive screen may be comprised of only the insulator, and it may be directly image-charged or double-charged for image modification. In the latter case, positive and negative corona sources may be used to spray the insulator screen from opposite sides.

The screens may assume many different configurations, but all are characterized by an array of apertures therethrough to permit particle passage. The deployment, size, and shape of the apertures may vary from mesh to parallel lines or slots. When woven material is employed as the composite screen, the insulation is mounded on top of the strands.

Thus, the invention may, in the preferred form, comprise a composite screen mounted for endless movement and having at least an insulative and a conductive layer with coinciding mesh. An imaging station is provided which may enable positive or negative printing. When a photoconductor is employed as the insulator of the screen, such a material is an insulator in the dark and becomes conductive in the light. It can be charged by ions or an electrode and a light image is then used to discharge those areas to be printed. The light image is reproduced in negative form in the absence of either field charging or enhancing fields, because printing occurs where the image light impinges on the screen and the discharge has been diminished or reduced to zero.

For positive printing without using the enhancing field, the screen may be charged by an applied field during exposure to the light image. Illuminated areas of the screen photoconductive layer become conductive and, under the influence of the applied charge field, cause a charge separation similar to the double charge previously mentioned. After the charge separation is formed, the illumination is removed, causing all parts of the screen photosensitive layer to become insulative. Then, the charging field is removed and the portions of the field which were illuminated remain charged, and thus block the passage of the toner particles during the printing step.

In the absence of the enhancing field, the screen could only be modulated by blocking fields oriented in one direction, i.e., from zero to minus or zero to plus volts. The addition of the enhancing field enables modulated control for the full range, i.e., minus to plus volts. Thus, it may be appreciated that the enhancing field is always in the reverse direction of the blocking field, although depending upon the sign of the particle to pass through the screen, the enhancing field may block and the blocking field may enhance. This flexibility enables either positive or negative printing at the flip of a switch.

Normally, the enhancing field may be characterized as being in the same direction as the propulsion field for the particles passing through the screen to the print receiving paper or material. It may further be characterized as deploying a reverse charge in the areas heretofore discharged.

Of great importance is the fact that the enhancing field electrically enlarges the aperture beyond its physical dimensions. It may be likened to a funnel leading into the aperture from both the entrance and exit sides so that an increased amount of toner or marking material is caused to pass through an enhanced aperture. This increases the printed density and fills in the dots for solid printing with densities approaching 100 percent. Thus, the addition of the enhancing field enables control from zero aperture opening to a size opening effectively beyond that of the aperture.

In any event, the modulated apertures of the screen, depicting the image area, move into or are subject to the propulsion field where charged toner particles are projected toward the screen and pass through the screen in accordance with the modulation to continue across an air gap, due to the propulsion field, to a print receiving substrate such as ordinary paper. Although the word paper is used hereinafter, the invention is not limited to printing on paper, or even to printing on flat surfaces. A heat fixing station fixes the ink, where necessary, because this process may employ powdered inks, as well as aerosol sprays, or liquid droplets. The conductor may not face the toner source in all embodiments.

With the foregoing in mind, it is among the objects of the invention to provide an aperture controlled electrostatic printing process and method which enables printing through a modulated screen onto ordinary paper, across an air gap.

Another object is the provision of aperture control from zero opening through an effectively enlarged opening which substantially exceeds the physical dimensions of the screen opening.

It is a further object of the invention to provide such reproduction simulating half-tone printing with varying degrees of gray to black printing or sequential color reproduction.

A further object of the invention is the provision of a multi-layer screen susceptible to image modulation in both forward and reverse directions for controlling the passage of charged toner material therethrough.

It is a further object of the invention to provide a method wherein a double layer charging of a screen may be employed for subsequent modulation including reversal of the charging in selected areas to provide blocking fields or enhancing fields in the apertures of areas of the image being reproduced, depending on whether positive or negative printing is being achieved.

Yet another object is the provision of selective positive or negative printing free of holidays and with good edge effects.

Another object is the provision of apparatus and methods for electrostatic reproducing or constituting through the use of screen means comprising an array of apertures wherein forward and reverwe fields are established in accordance with a pattern for controlling charged particles directed at the screen means.

A further object is the provision of arrangements for contact charging a screen comprised of at least an insulative layer.

Yet another object is the provision of contact charging, incorporating enhancing fields.

A still further object of the invention is the provision of office copy apparatus and methods incorporating electrostatic techniques.

Another object is the provision of an electrostatic camera.

A still further object is a provision of a computer print-out arrangement utilizing electrostatic techniques.

It is another object of the invention to provide electrostatic typewriter arrangements.

Yet another object is a provision of electrostatic facsimile print-out,

Further, it is an object to provide an electrostatic enlarger and/or printing device.

A further object is the provision of printers incorporating the electrostatic transfer of charged particles.

The invention will be better understood from a reading of the following detailed description thereof when taken in conjunction with the drawing wherein.

Figure 8A:
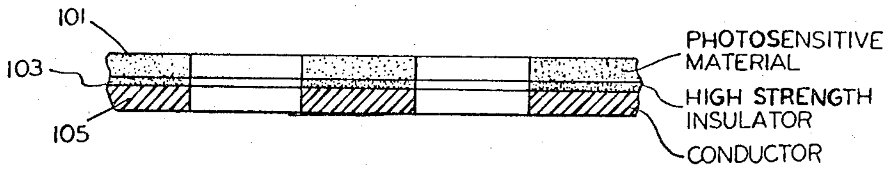
Figure 8B:
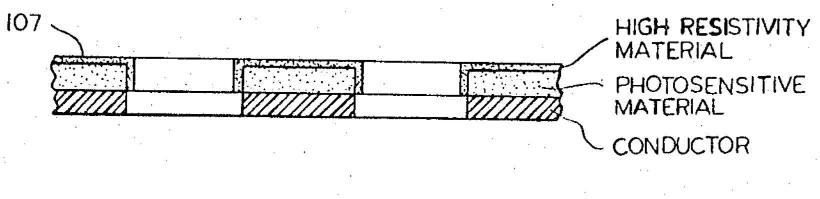
Figure 8C:
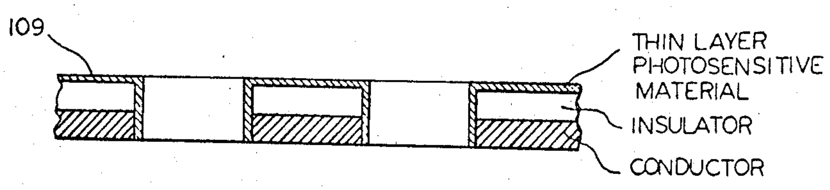
Figure 9:
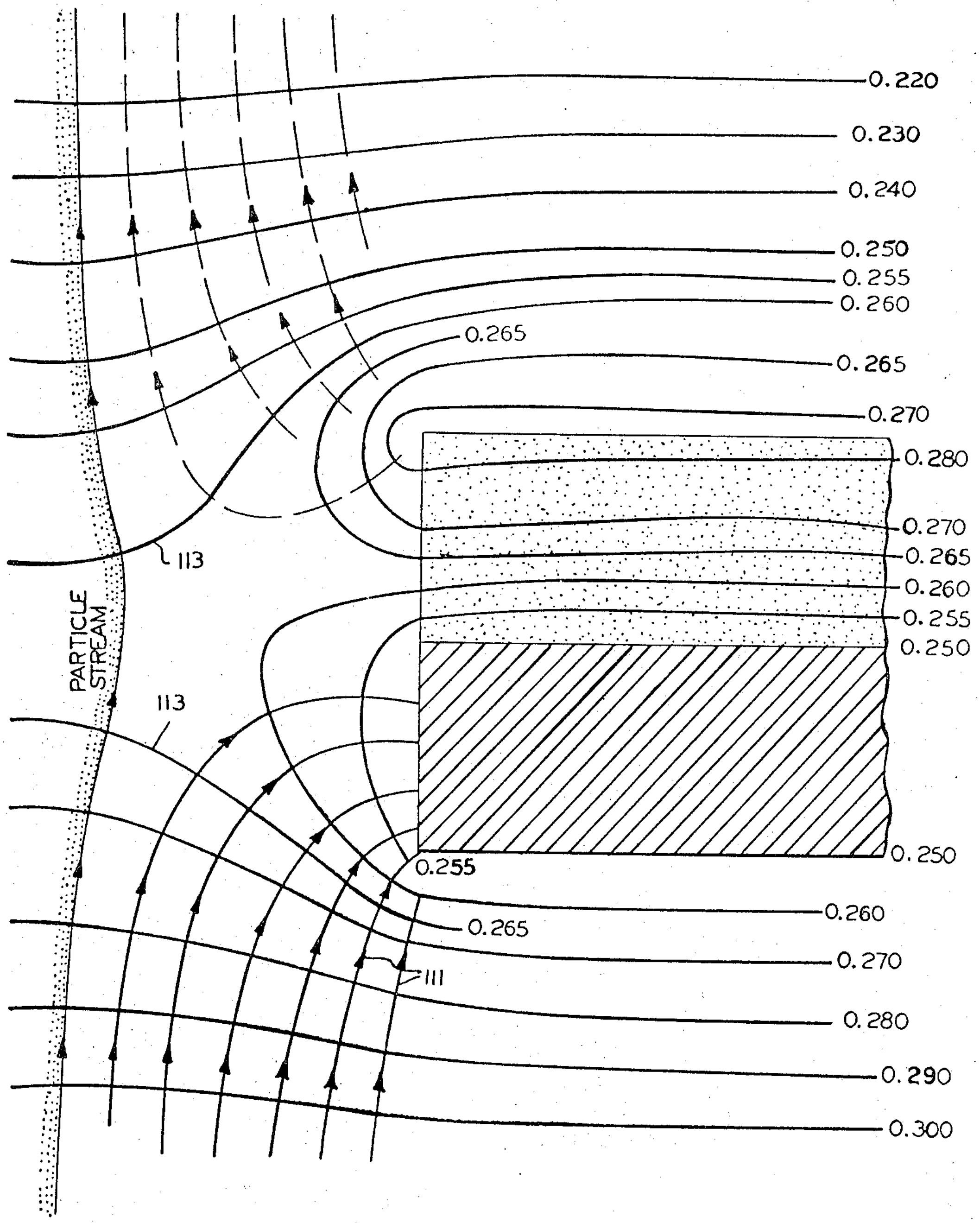
Figure 10:
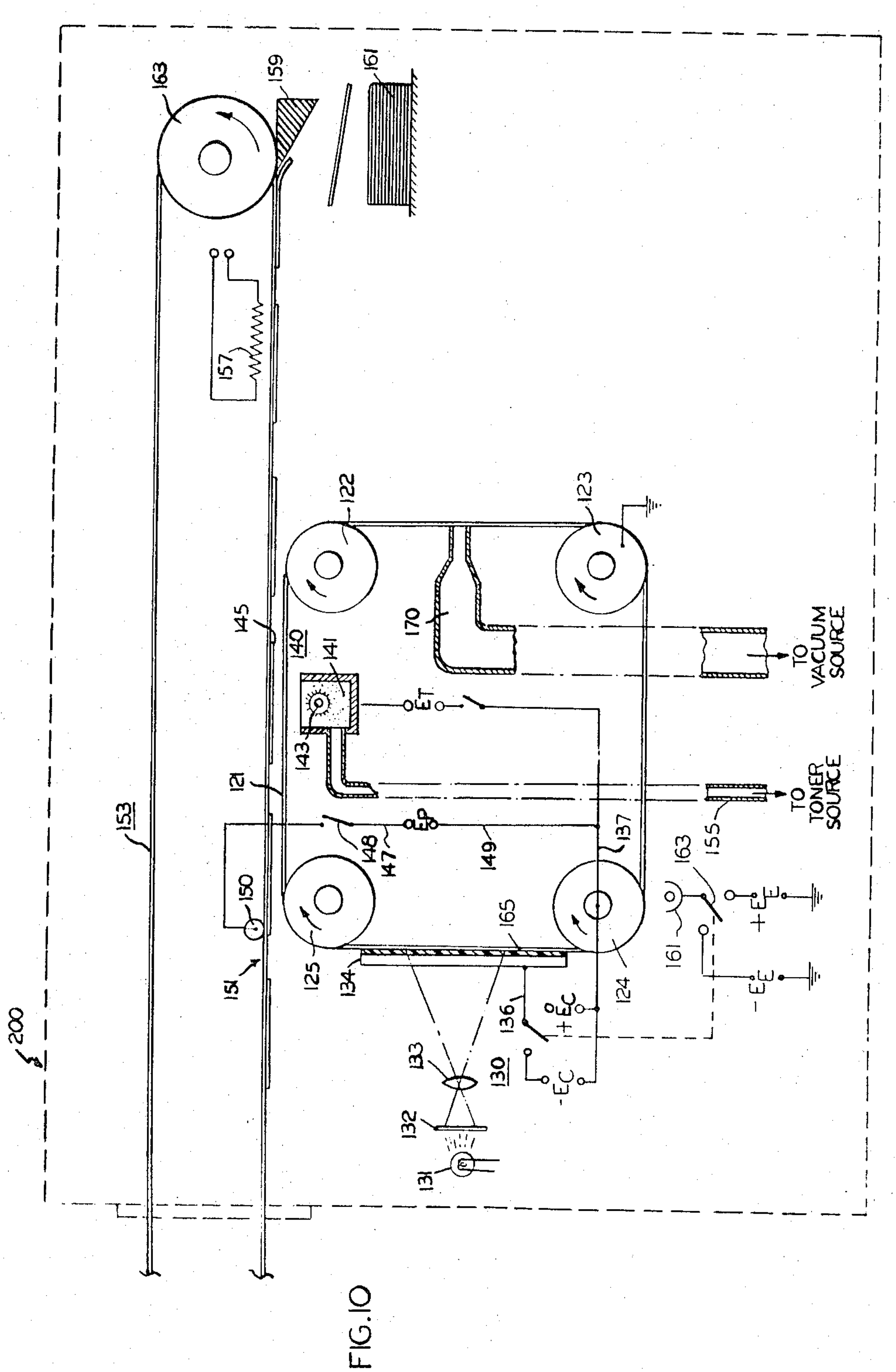
Figure 11:
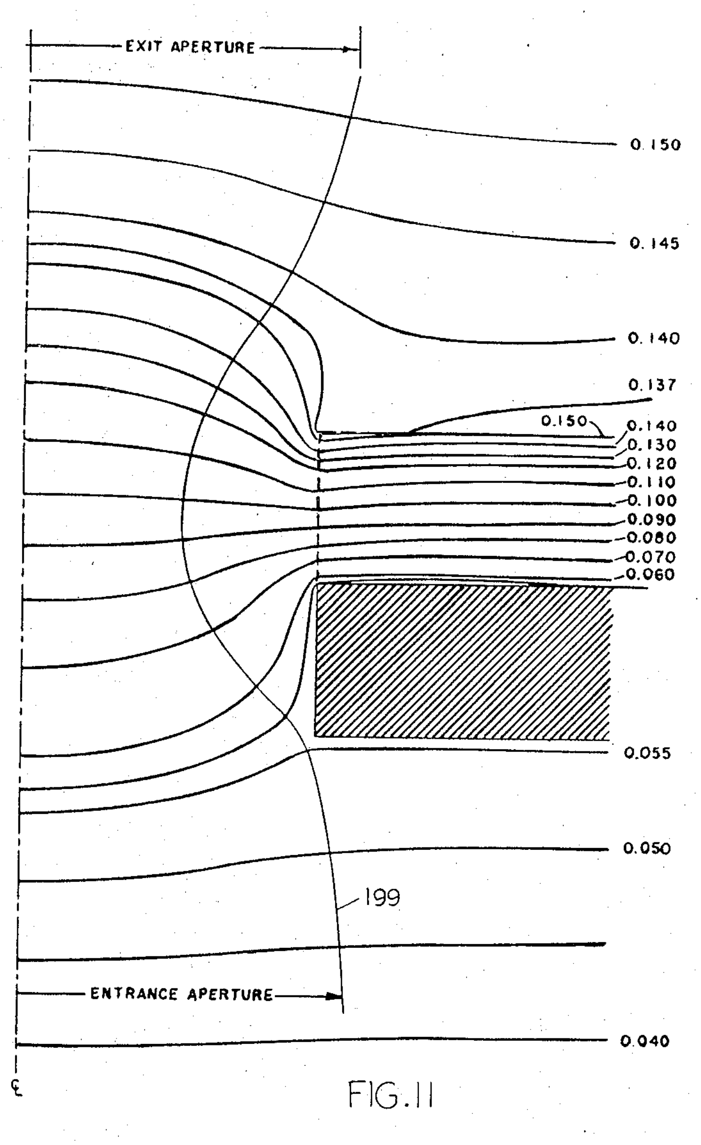
Figure 12:
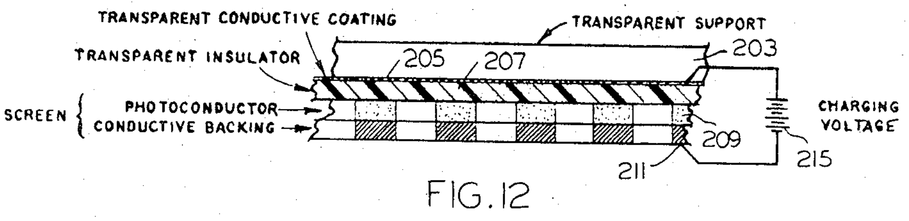
Figure 13:
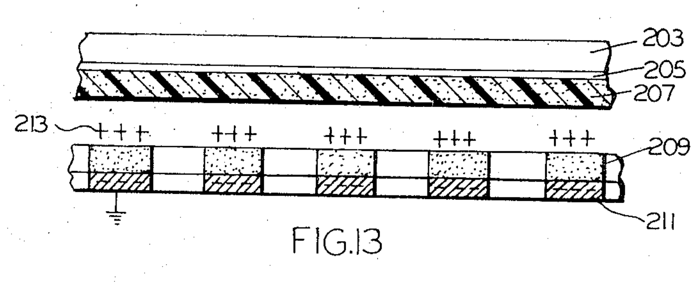
Figure 14:
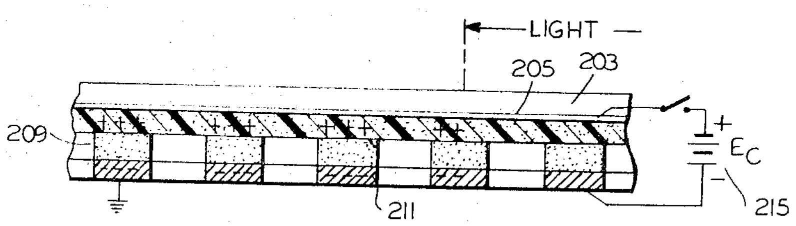
Figure 15:
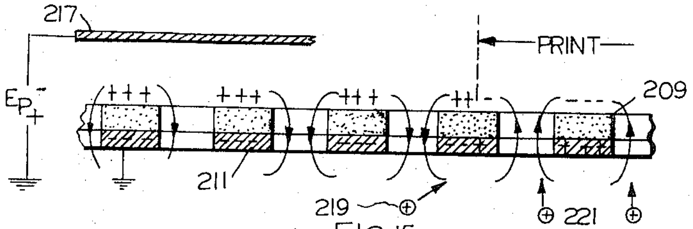
Figure 16:
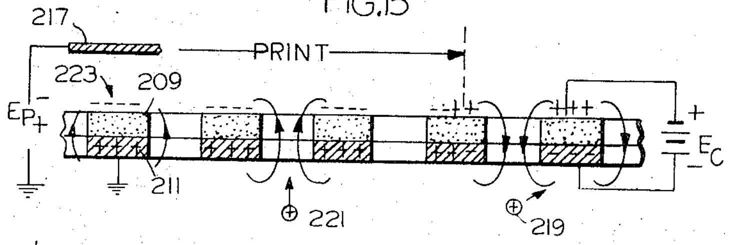
Figure 17:
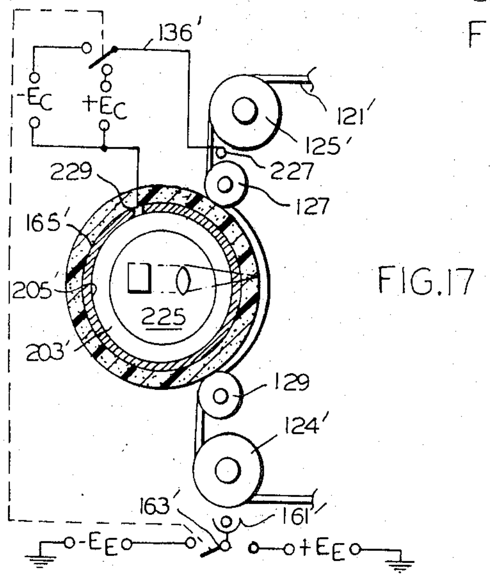
Figure 18:
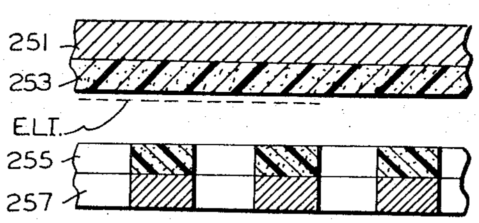
Figure 19:
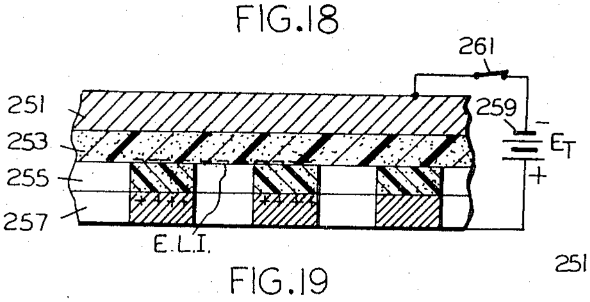
Figure 20:
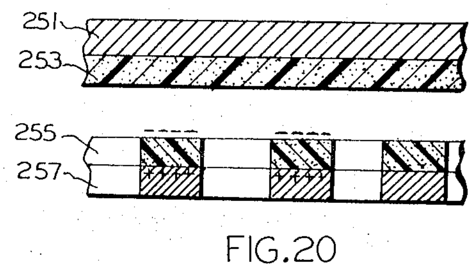
Figure 21:
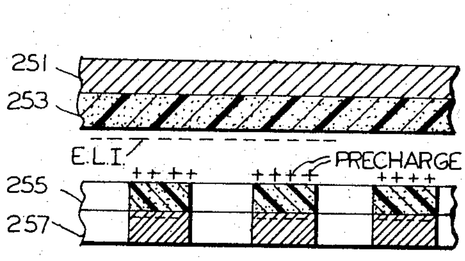
Figure 22:
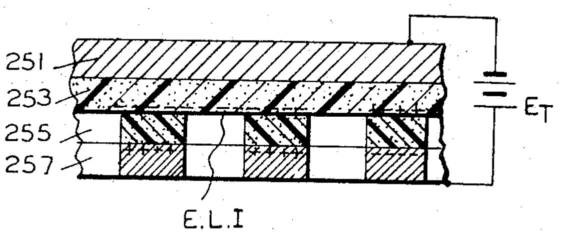
Figure 23:
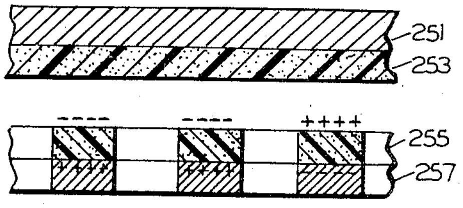
Figure 24:
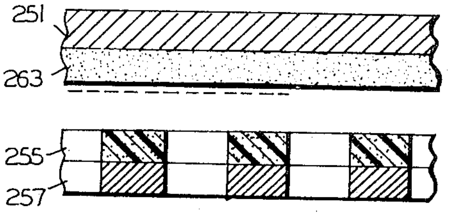
Figure 25:
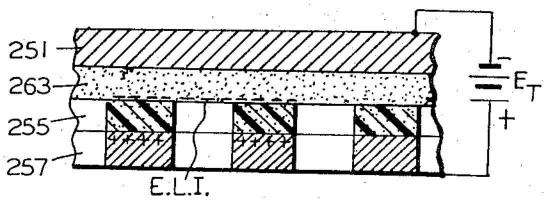
Figure 26:
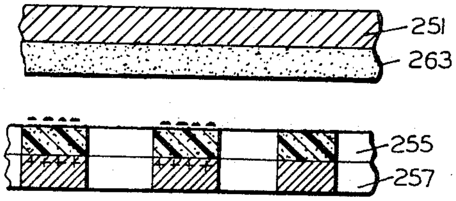
Figure 27:
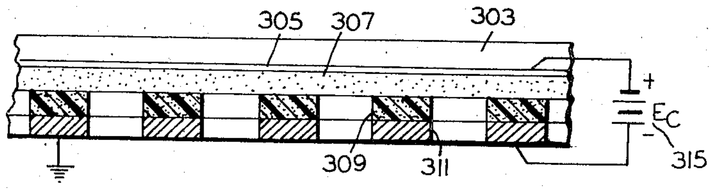
Figure 28:
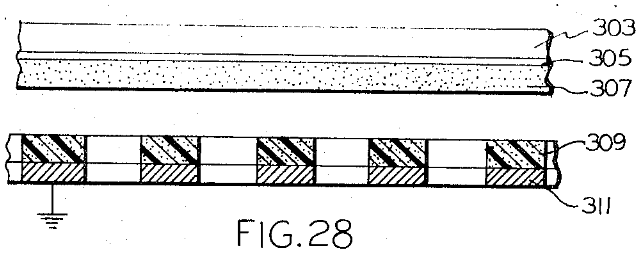
Figure 29:
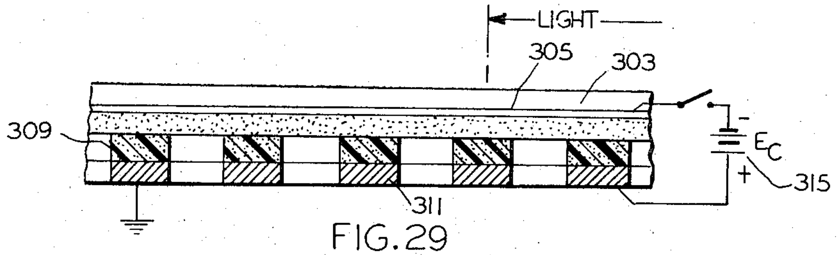
Figure 30:
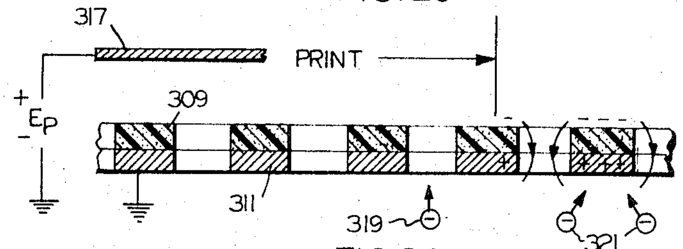
Figure 31:
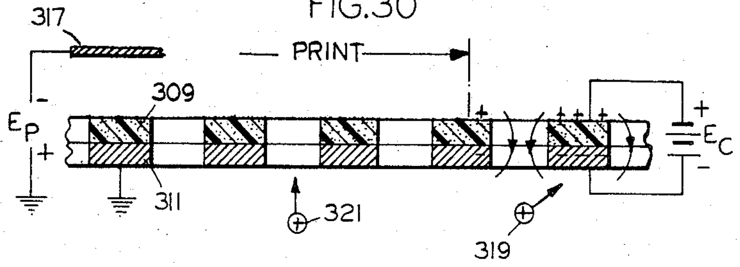
Figure 32:
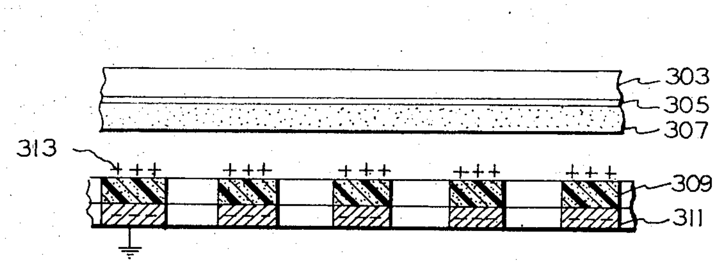
Figure 33:
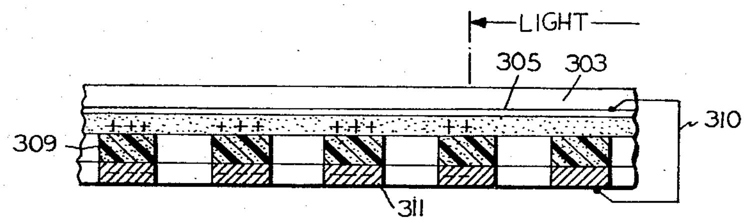
Figure 34:
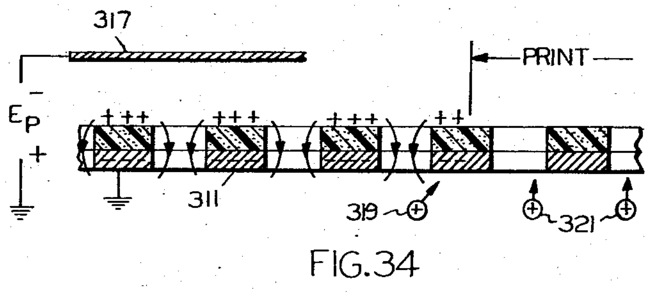
Figure 35:
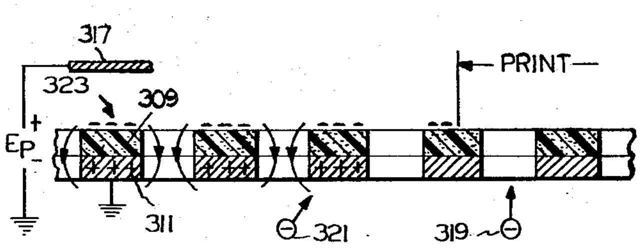
Figure 36:
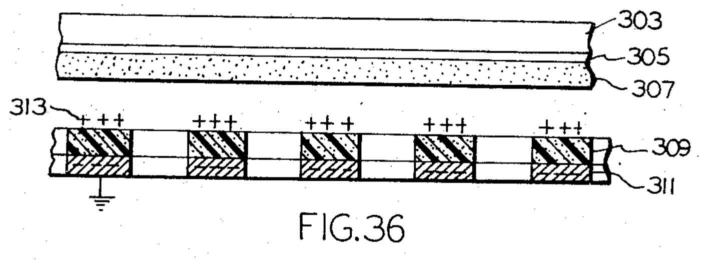
Figure 37:
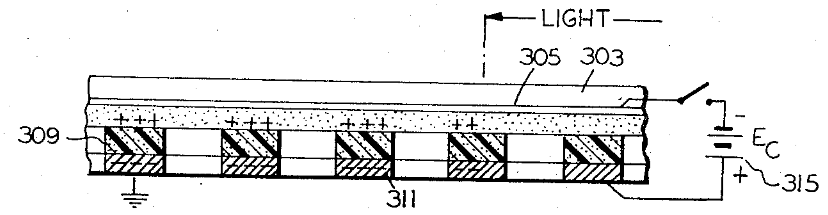
Figure 38:
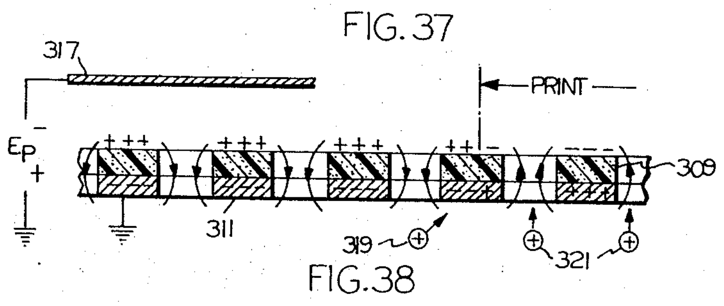
Figure 39:
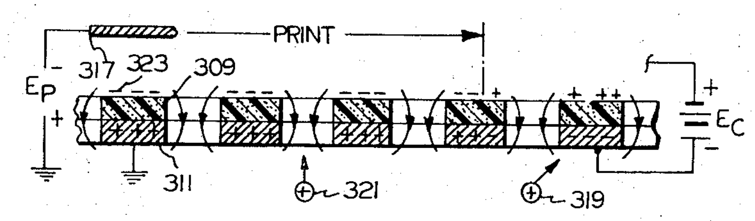
Figure 42:
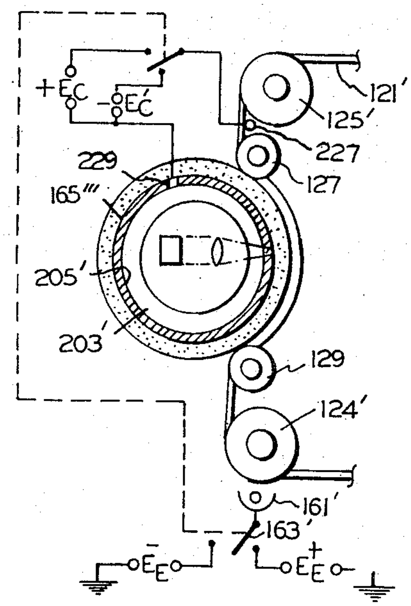
Figure 41:
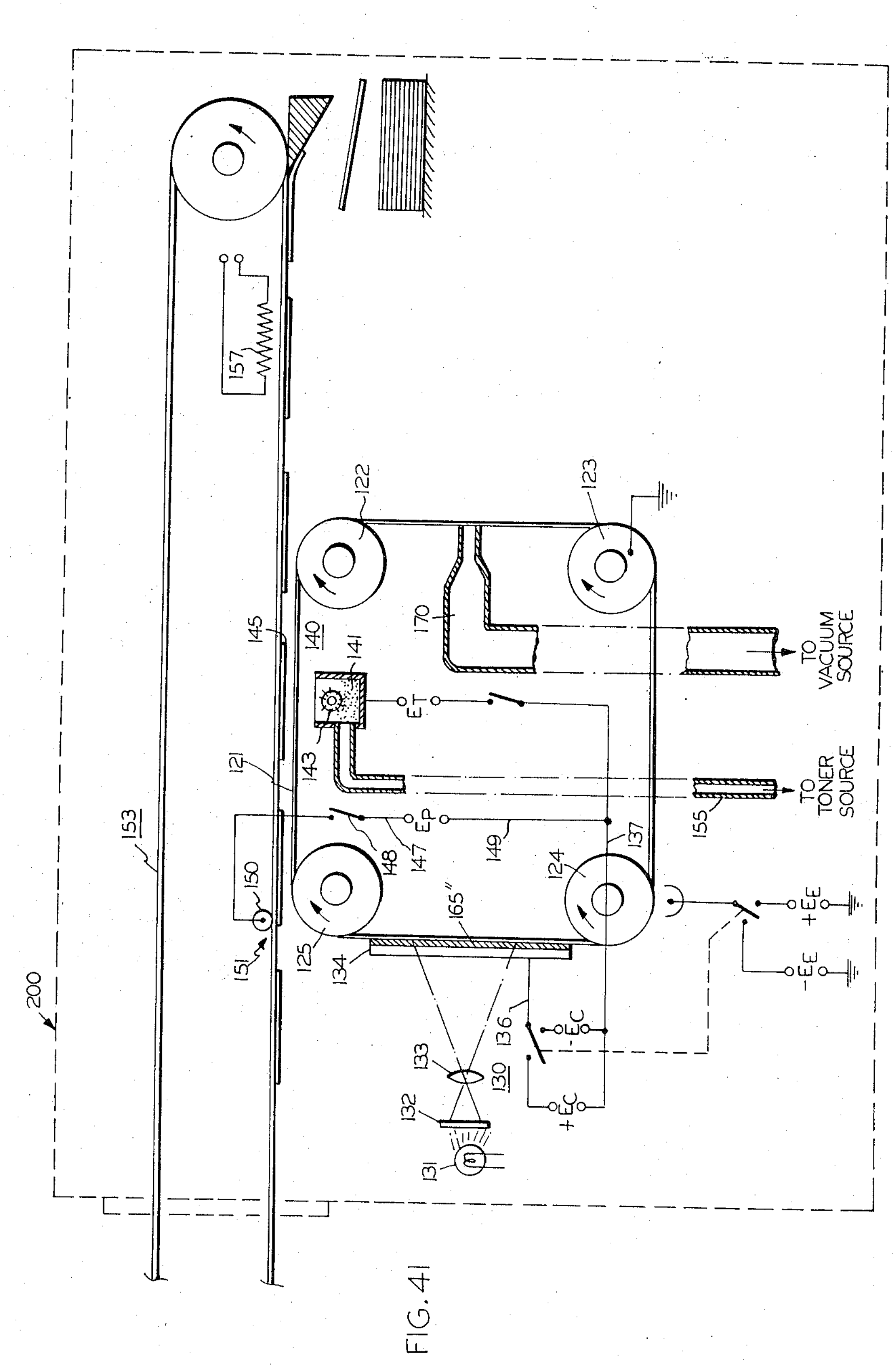
Figure 43:
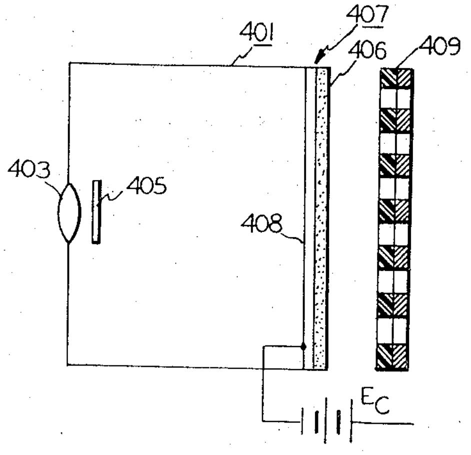
Figure 44:
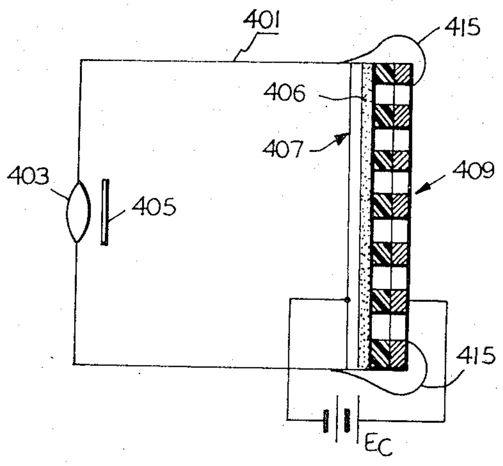
Figure 45:
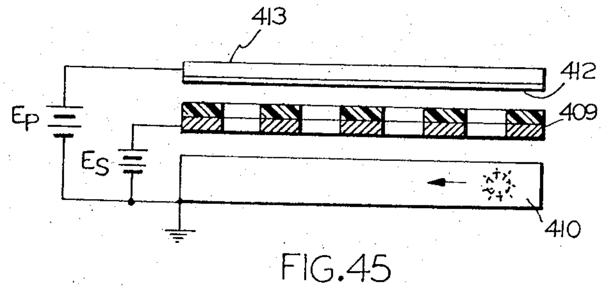
Figure 46:
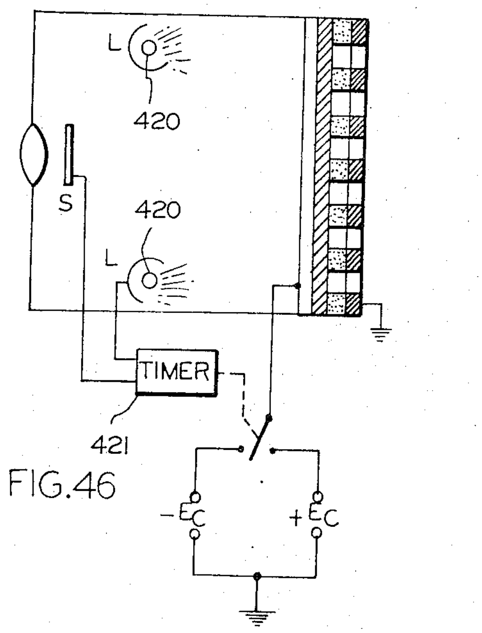
Figure 47:
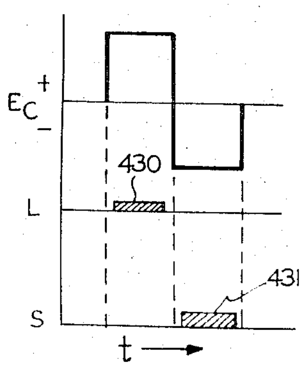
Figure 48:
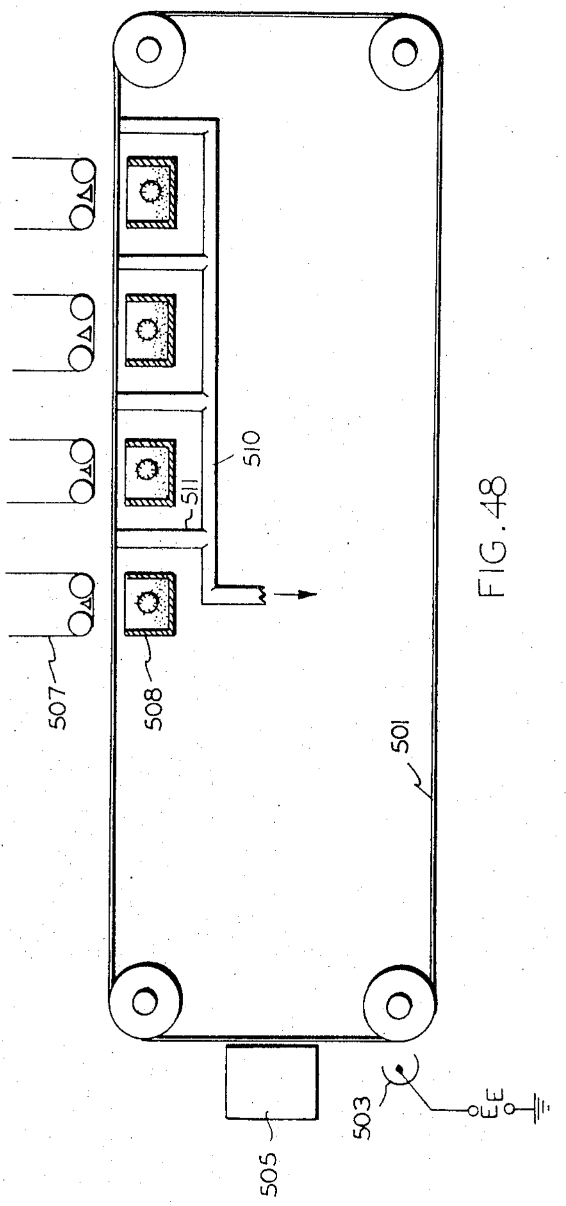
Figure 49:
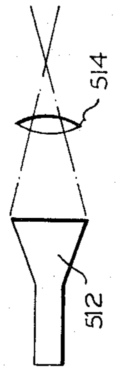
Figure 50:
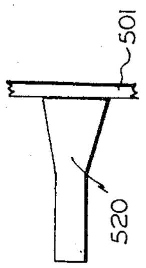
Figure 51:
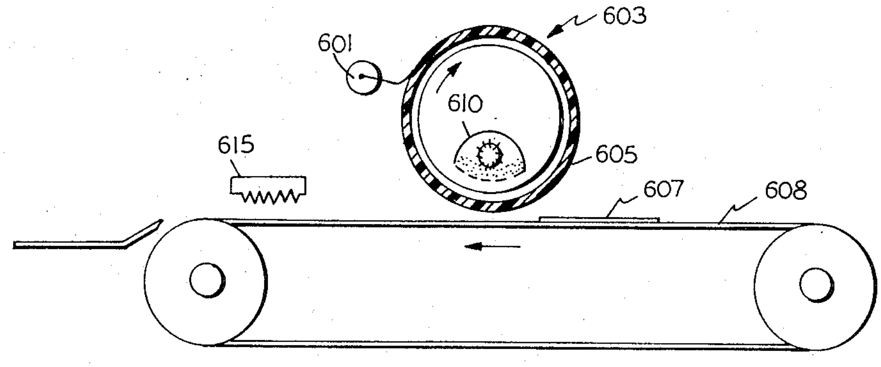
Figure 52:
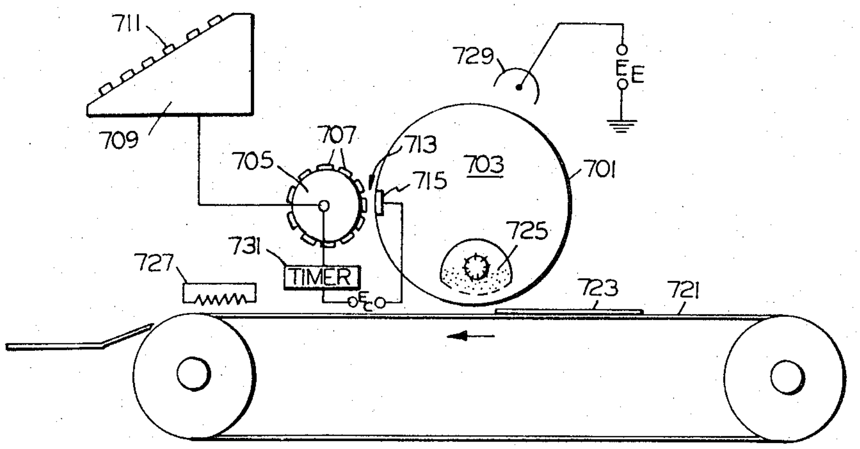
Figure 53:
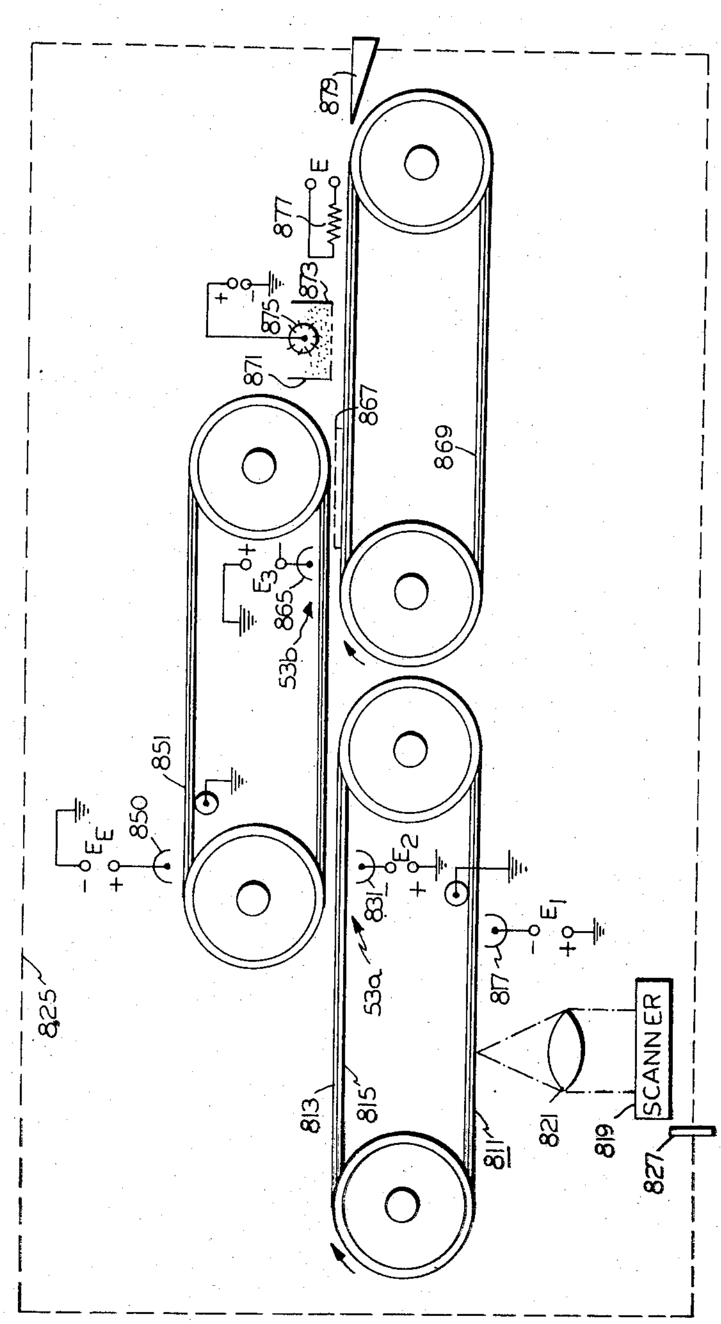
Figure 53B:
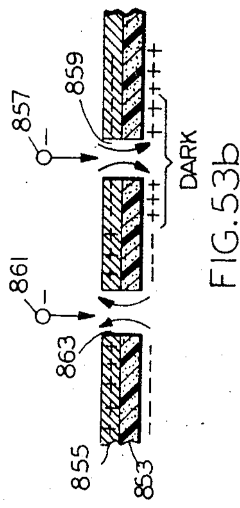
Figure 53A:
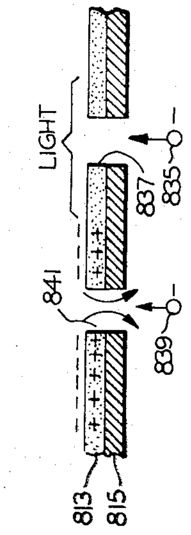
Figure 54:
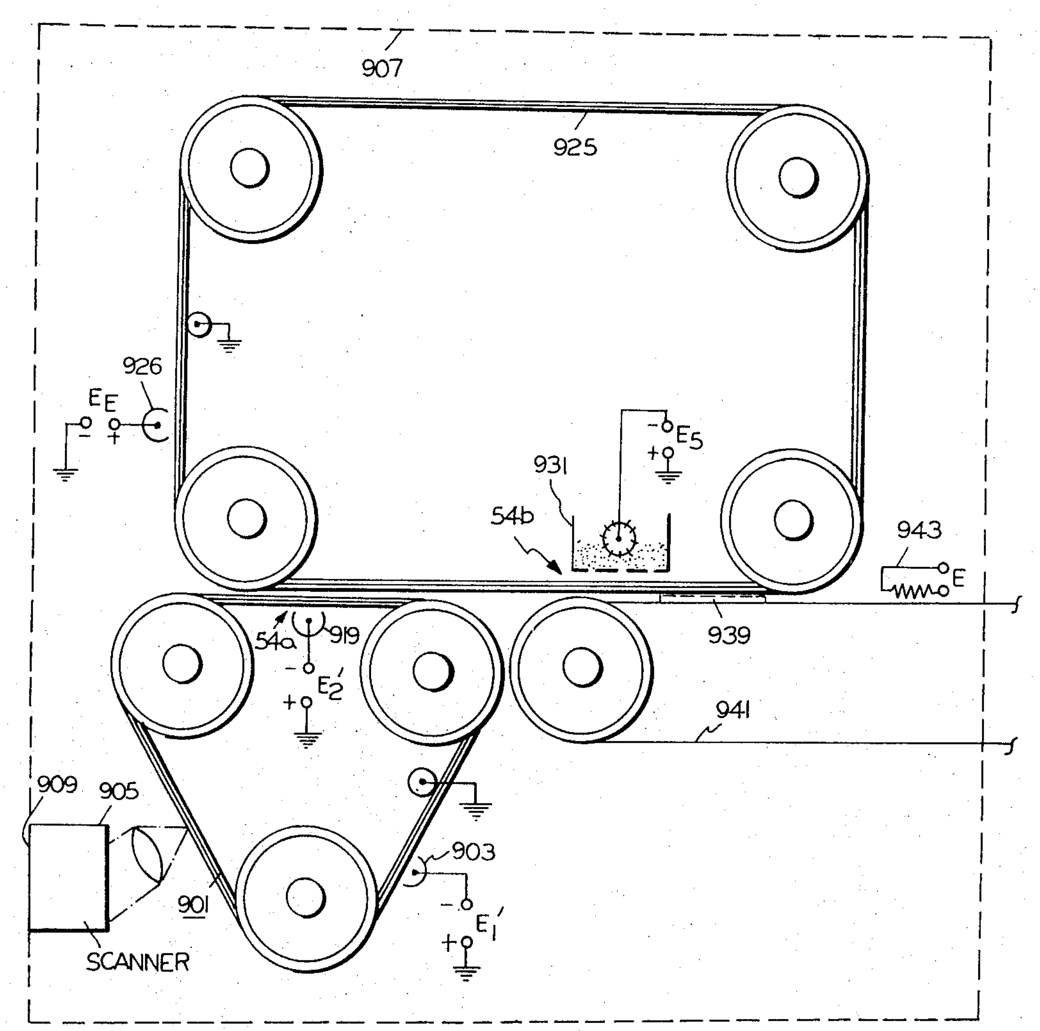
Figure 54A:
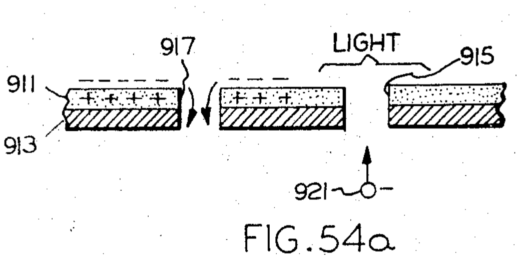
Figure 54B:
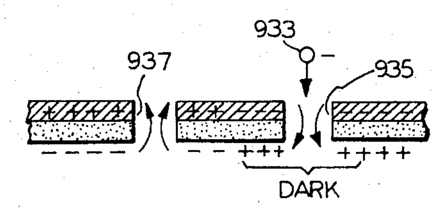
Figure 55:
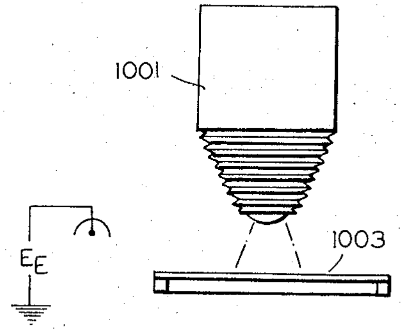
Figures 56, 57, 58:
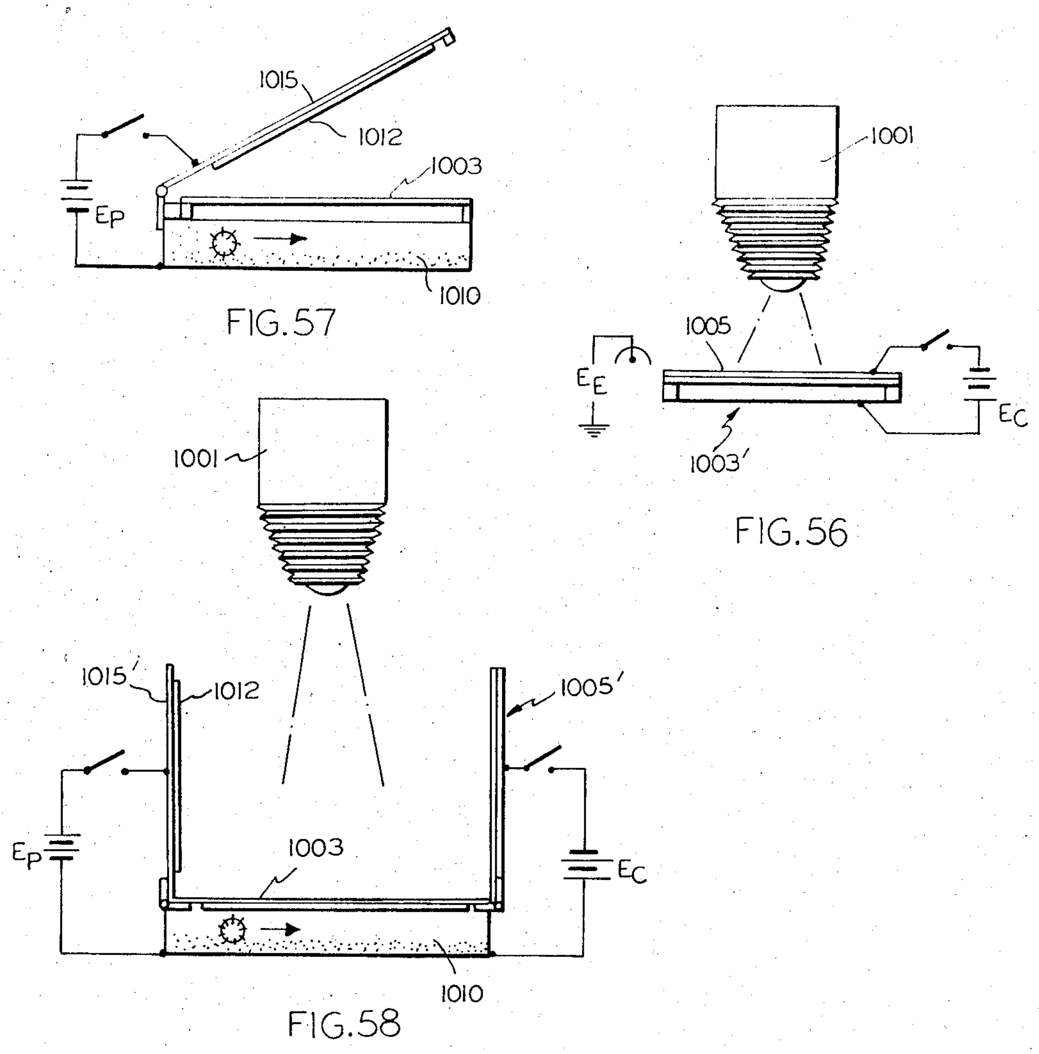
Figure 59:
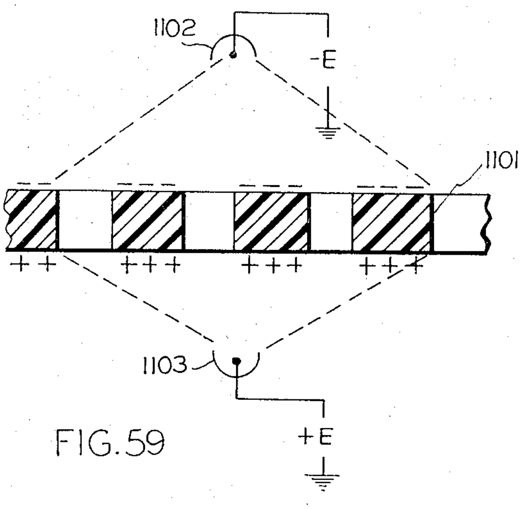
Figure 60:
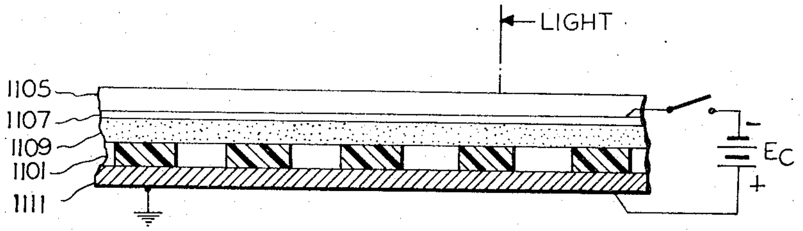
Figure 61:
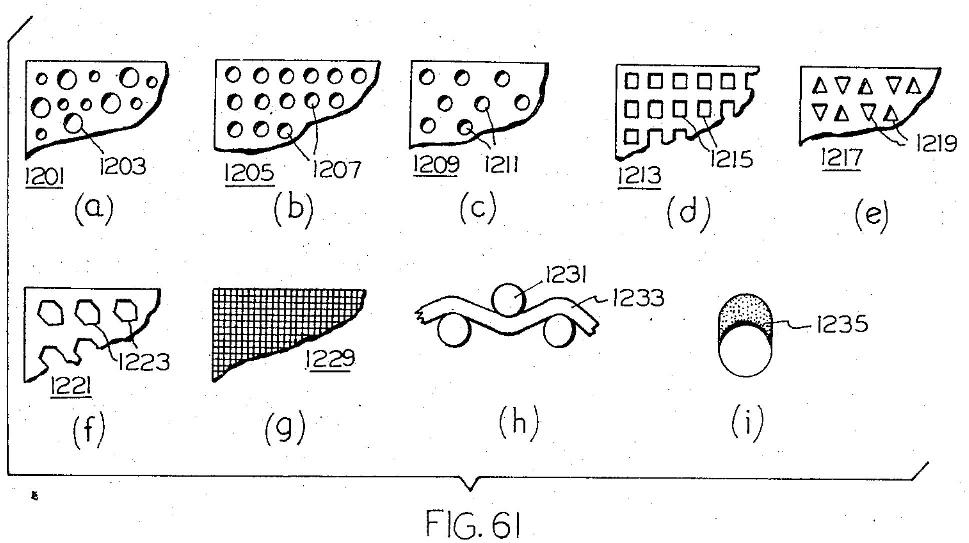

FIG. 8*a* is a view, in cross section, of a portion of a screen showing the use of low dielectric strength photosensitive material in conjunction with high dielectric strength insulative material intermediate the photosensitive layer and the conductive layer;

FIG. 8*b* is a similar view showing the use of high resistivity material as the charge carrier overlying photosensitive material with poor surface resistivity;

FIG. 8*c* is another view employing a conductive layer, a good insulative layer and a thin layer of photosensitive material deposited over the insulator and within the apertures;

FIG. 9 depicts a computer analysis of the electrical fields within an aperture which is only partially charged as it has insufficient charge for full blocking;

FIG. 10 is a schematic arrangement showing suitable apparatus for carrying out the method with and without the enhancing field;

FIG. 11 depicts a computer analysis of the field geometry for a combination of enhancing field and propulsion field;

FIG. 12 shows in cross section an improved arrangement for field charging;

FIG. 13 shows the structure of FIG. 12 with the enhancing field charge level applied prior to exposure;

FIG. 14 shows the arrangement of FIG. 13 following exposure but prior to application of the $E_c$ field merely to represent charge distribution;

FIG. 15 shows the final charge distribution in the field charging arrangement with enhancing field;

FIG. 16 shows the final charge distribution for an enhancing field of charge opposite to FIGS. 13–15;

FIG. 16*a* is a chart showing polarity possibilities for printing with positive and negative particles;

FIG. 17 illustrates a continuous printer using field charging with enhancing field charge level;

FIG. 18 shows a dielectric layer with electrostatic latent image for transfer to the double layer screen;

FIG. 19 shows the dielectric layer in proximity to or contact with the screen with an applied transfer source;

FIG. 20 shows the dielectric separated from the screen after transfer of the electrostatic latent image;

FIGS. 21, 22, and 23 show the steps of FIGS. 18, 19, and 20, but additionally include a precharge on the screen of FIG. 21 so that after transfer of the electrostatic latent image, the screen of FIG. 23 is charge modulated in both forward and reverse directions;

FIG. 24 depicts a xerographic plate with electrostatic latent image for transfer to the screen;

FIG. 25 includes the applied transfer source for proximity or contact transfer;

FIG. 26 shows the screen with the transferred electrostatic latent image;

FIG. 27 shows a contact charging plate applied to an insulator type screen;

FIG. 28 shows the contact charging plate and screen separated prior to any charging or exposure;

FIG. 29 shows the two parts together along with the charging potential $E_c$;

FIG. 30 shows the polarity of the charges on the screen as a result of exposure with the charging potential connected;

FIG. 31 shows the polarity on the screen for the opposite potential;

FIG. 32 shows the contact charging plate prior to application to the screen but with a precharge on the screen;

FIG. 33 shows the two parts together with a connection therebetween to modify the precharge by exposure;

FIG. 34 shows printing using positive particles;

FIG. 35 illustrates printing using negative particles;

FIG. 36 shows the screen precharged;

FIG. 37 shows the parts together prior to application of the charging potential;

FIG. 38 illustrates the polarity for forward and reverse fields with positive particles used for printing;

FIG. 39 shows the polarity distribution when a negative precharge has been used;

FIG. 40 is a chart or table for potential selection relative to positive and negative printing employing particles of either sign;

FIG. 41 shows a schematic arrangement incorporating contact charging;

FIG. 42 illustrates a continuous type printer incorporating contact charging;

In FIG. 43 there is shown components for an electrostatic camera capable of photographing onto ordinary paper;

In FIG. 44 the components are assembled to comprise the camera;

FIG. 45 illustrates a typical developing arrangement for the camera;

FIG. 46 shows the camera incorporating enhancing field control;

FIG. 47 is a synchronizing chart for the camera;

FIG. 48 shows a multi-copy computer print-out arrangement;

FIGS. 49 and 50 disclose alternative arrangements for the image station of FIG. 48;

FIG. 51 depicts facsimile readout apparatus;

FIG. 52 is a schematic view of an electrostatic typewriter;

FIG. 53 shows an ion projection system using a dielectric receiving medium;

FIGS. 53*a* and 53*b* show blocking and ènhancing arrangements for the system of FIG. 53;

FIG. 54 is an ion system incorporating toner projection for printing on ordinary paper;

FIG. 54*a* and 54*b* show blocking and enhancing arrangements for the system of FIG. 54;

FIG. 55 depicts an electrostatic enlarger and/or printing arrangement incorporating a photoconductive screen;

FIG. 56 is an electrostatic enlarger and/or printing arrangement using contact charging or field charging;

FIG. 57 is a developing station for the apparatus of FIGS. 55 or 56;

FIG. 58 discloses an electrostatic enlarger and/or printing apparatus including developing means;

FIG. 59 shows the screen means as an insulator, per se, with a charging arrangement;

FIG. 60 discloses an alternative arrangement for charging the insulator of FIG. 59; and, FIG. 61 shows detailed configurations 61*a*–61*b* for the screen means.

Figure 1:
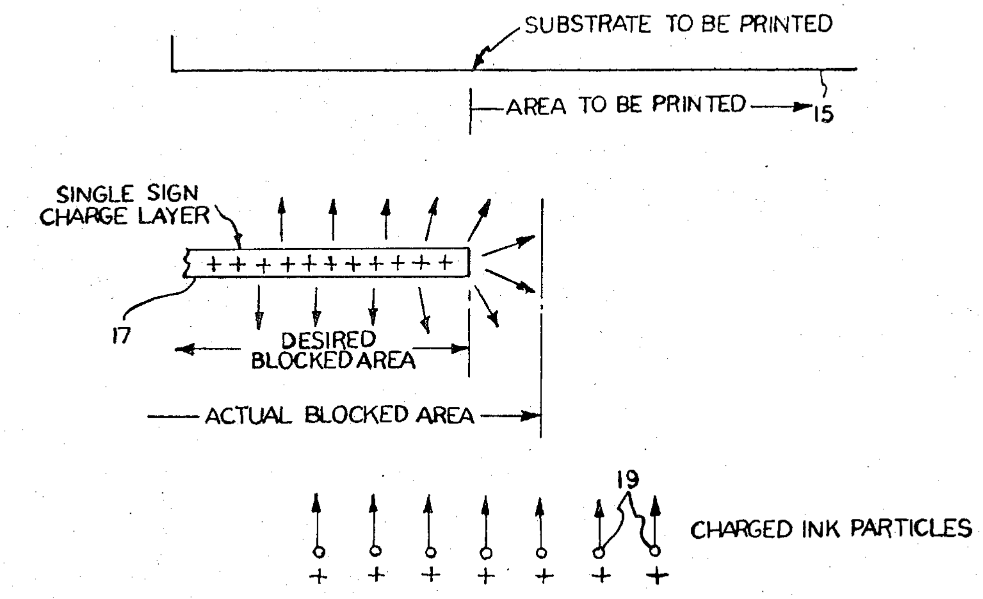
FIG. 1 is an arrangement to depict single charge stencil type blocking of charged toner particles with fringe effects.

In FIG. 1 there is shown an arrangement for stencil blocking utilizing a single sign charge layer only, to show the limitations of this approach. The substrate 15 to be printed is positioned behind the stencil 17 which is positively charged, and the charged ink particles or toner material 19 are similarly charged and projected toward the substrate.

Electrostatic printing is normally achieved by the propulsion of the charged ink particles 19 through the fixed stencil 17 by means of an electric field. The blocked portions of the stencil 17 prevent passage of certain of the ink particles 19, thus forming the image that is printed. This use of mechanical blocking requires that the stencils be prepared, by mechanical or photochemical means; these are slow processes, requiring several hours for the completion of a screen stencil.

Greater usefulness of the electrostatic printing process would be achieved if the stencils could be substituted for and the substitute prepared within seconds, and if the image could be erased and the screen roused.

As is well known, the presence of a concentration of charges will create surrounding fields such that the charges of like sign are repelled from the charged area. It is clear that if an image is formed of coplanar uniformly charged layers, and the sign of the charges used to form the image is the same as the charge on the toner particles, the toner will be repelled from the charged areas, thus producing the blocking required to use the image as a stencil. Since this blocking of the passage of the charged toner or equivalent is accomplished by the field surrounding the charge layer, these fields are called "blocking fields."

However, a one sign charge layer will not satisfy the requirements of a blocking field since the fields of such a system extend in all directions from the charges. Thus, toner particles will be repelled not only from the surface of the charge layer (the desired blocking effect) but also from the edges of the charge layer, which exist at the image boundaries (FIG. 1). For printing to occur, particles must pass through the uncharged areas (indicated in FIG. 1 as "AREA TO BE PRINTED"). The lateral repulsion field existing at the edge of the layer increases the blocking area, diffuses the edges of the printed image, and prevents passage of ink through small gaps in the charge layer.

The present invention overcomes the problems described above while permitting the desired charge layer blocking in the nonprinting areas of the image.

Figure 2:
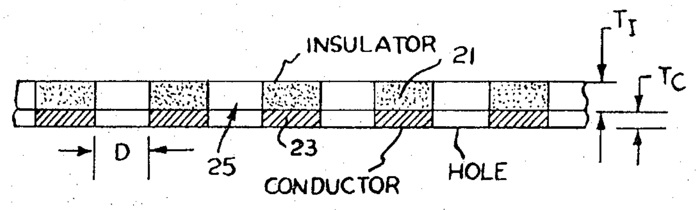
FIG. 2 is a view in section of a preferred embodiment of the screen of the present invention.

The screen used to carry the charges, and the disposition of charges on the screen so as to perform the blocking action on the toner, thus forming a printed image, are illustrated in FIG. 2. The screen is constructed of conventional insulator material 21, layered with a conductor 23, the holes 25, through which the ink particles pass, extend in coincidence through both layers of the screen.

Electrical connection is made to the conductor layer 23 of the screen by tab 31 and lead 33 (FIG. 3) so that the potential of the backing members can be maintained during printing and charging.

Figure 3:
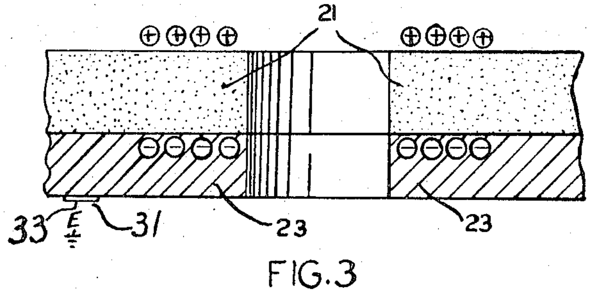
FIG. 3 is an enlarged view of a portion of FIG. 2.

The insulator portion is charged so as to acquire a "double layer" of charge (as indicated in FIG. 3) in which one face of the insulator 21 contains charges of one polarity, while the other surface contains an equal amount of charge of opposite polarity. (The charge layer which is formed on the insulator surface, in contact with the conductor, appears on the surface of the conductor 23, as shown in FIG. 3.) Thus, the net charge on the screen is zero; therefore, no field exists from these charges at a distance of more than a few screen thicknesses away from the charged double layer. The motion of toner particles which have passages through the screen at uncharged areas is therefore only slightly affected by the charged areas of the screen.

Charging of the form indicated in FIG. 3, is made possible by the presence of the conductor layer. A charge source (such as a corona wand or radioactive strip) is used to spray ions on the surface of the insulator; the conductor portion of the screen is maintained at a fixed potential during this process so that any charge which deposits on the insulator surface will attract an equal and opposite charge to the junction between the insulator and the conductor, thus creating the required double layer.

Figure 4:
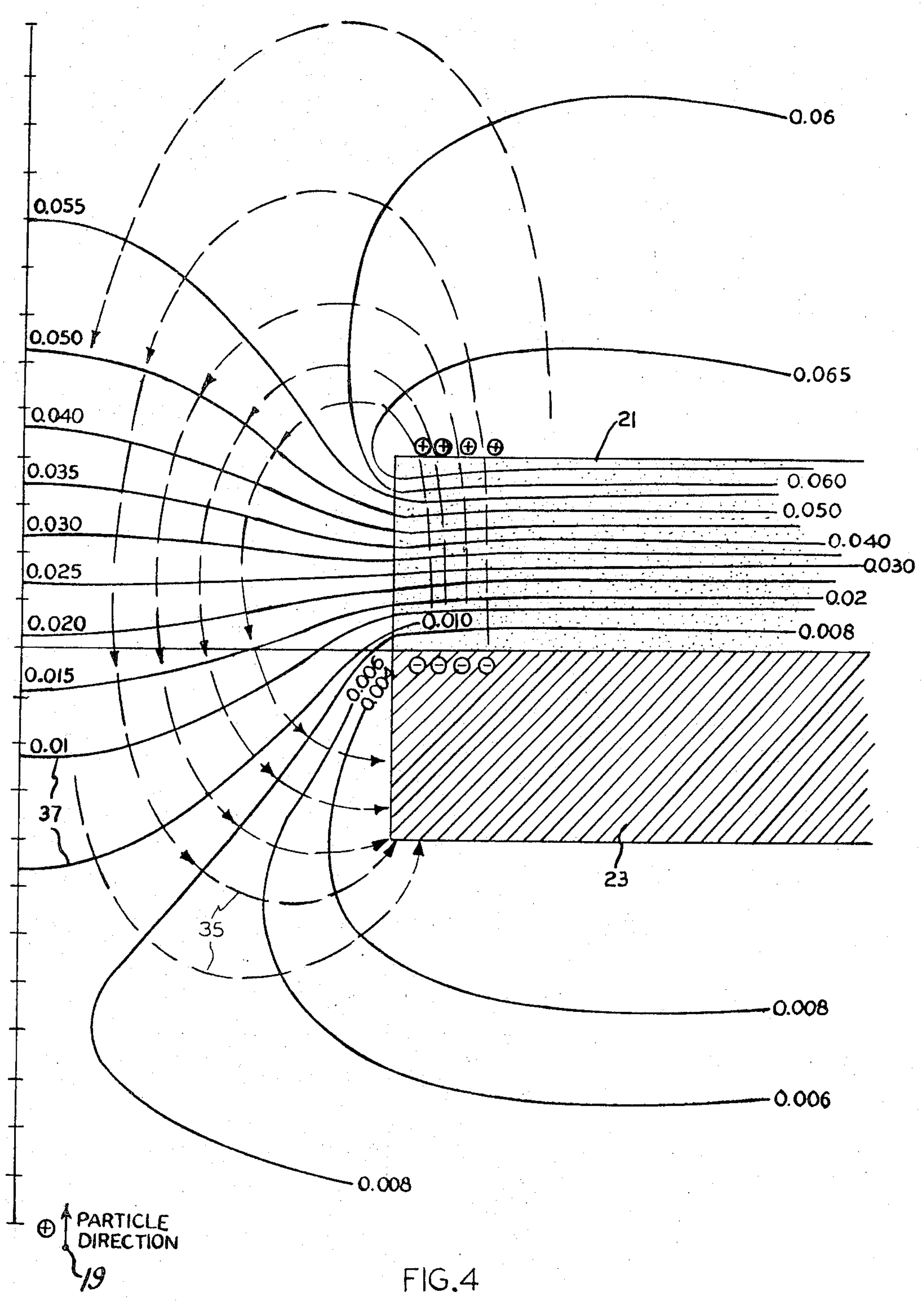
FIG. 4 depicts a computer analysis of the fringing or blocking field in association with a single aperture of the screen.

Blocking of ink particles in the charged areas is performed by the fringing field which exists within the holes of the screen. The fringing field is oriented so as to prevent charged ink particles from passing through the hole. The field structure of such a charged layer, as solved by computer analysis, is given in FIG. 4 in association with one-half of an aperture. In FIG. 4, the electrical force or field lines are depicted at 35, and the equipotential lines at 37, their magnitude being plotted along the ordinate axiw, through the center of the hole or aperture. Thusly, it will be apparent that the positively charged particles) 19 will be deflected to one or the other sides of the aperture and collected by the conductor 23.

If the ink particles are positive, then the double layer charges are arranged so that the particles approach the screen's negatively charged side; conversely, negative particles must be directed toward the positively charged surface. The weakest fringing field exists along the center of the hole, and the magnitude of this field depends on both the charge magnitude (strength of the field inside the insulator) and the thickness-to-diameter ratio ($T_1/D$) for the screen to aperture. Since the fringing field increases in strength as the insulator thickness increases, it is clear that for effective blocking, a large ratio of $T_1/D$, as well as high charge level is desirable. The amount of fringing field required to block the charged particles depends on the strength of the field used to propel the particles from the source to the printing substrate. If the particles had no inertia, blocking would occur if the combination of fringing field and the propulsion field (which act in opposition) produce a net zero field or repulsive field at any point along the centerline of the hole. However, particle inertia effects (which increase with particle diameter) will carry the particle through the hole unless the combined fields within the hole exert a not repelling force.

Prototype designs have indicated that the internal field in the insulator should be at least eight to 10 times the propulsion field if the $T_1/D$ ratio is 0.25. Thus, for a screen with 0.008 diameter holes, an insulator thickness of 0.002, and a propulsion field of 5,000 V/in., the screen should be charged to a potential of 100 volts.

Figure 5:
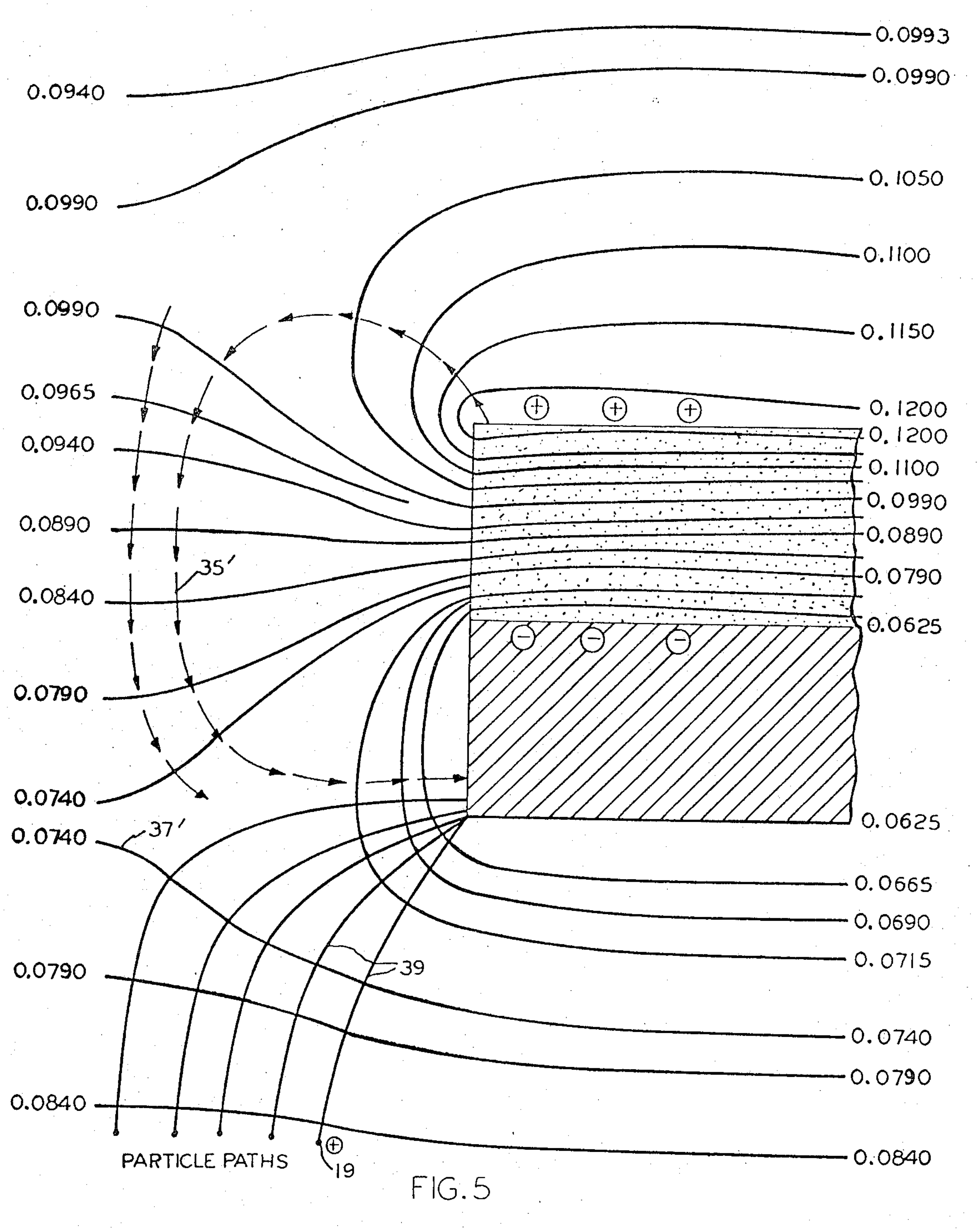
FIG. 5 depicts a computer analysis of a combined propulsion and fringing field for a single aperture of the screen.

The field structure for a blocking effect (combined propulsion and fringing fields) is shown in FIG. 5 indicates a second major function of the conductive layer. Particles which are blocked, deposit on the conductor portion; if the conductor were not present, these charged particles would soon neutralize the charge on the screen and blocking action would cease. The conductor, when maintained at constant potential during printing, will shield the charge on the insulator from the effects of the accumulated ink particle charges.

In FIG. 5 the combined effects of the propulsion and fringing fields are plotted and field force lines 35' and equipotential lines 37', as well as the particle paths 39 indicate how the aperture is blocked.

To obtain printing, the charge image on the screen in one embodiment must be the negative of the desired print; i.e., printing will occur where no charge exists. A number of techniques may be used to create the charge image.

Figure 6:
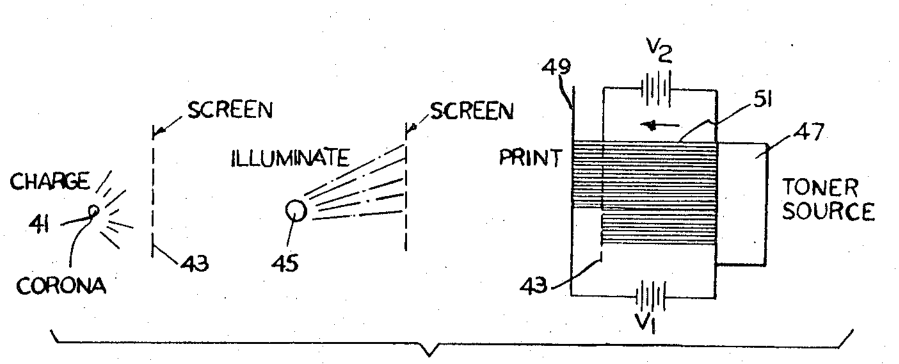
FIG. 6 is a schematic illustration of the processing steps for reproducing the light image in negative form.

The preferred technique the utilization of a photoconductive material as the insulator layer of the screen. Such a material, which is an insulator in the dark and becomes conductive in the light, can be charged as described above (i.e., with a corona wand) and a light image used to discharge those areas to be printed (FIG. 6). Thus, the light image would be reproduced in negative form. The corona wand 41 is used to uniformly charge the composite screen 43. Thereafter, the screen is illuminated from a light source 45 in accordance with the image (not shown). Next, the toner source 47 contains particles which are charged in conventional manner and ordinary paper serves as the print receiving medium, generally designated at 49. The propulsion field for the particles is represented by $V_1$ and the screen 43 has its conductive layer maintained at $V_2$. The blocking effect of a portion of the screen is illustrated by the particle paths 51, some of which penetrate the screen to deposit particles on the paper 49.

Figure 7:
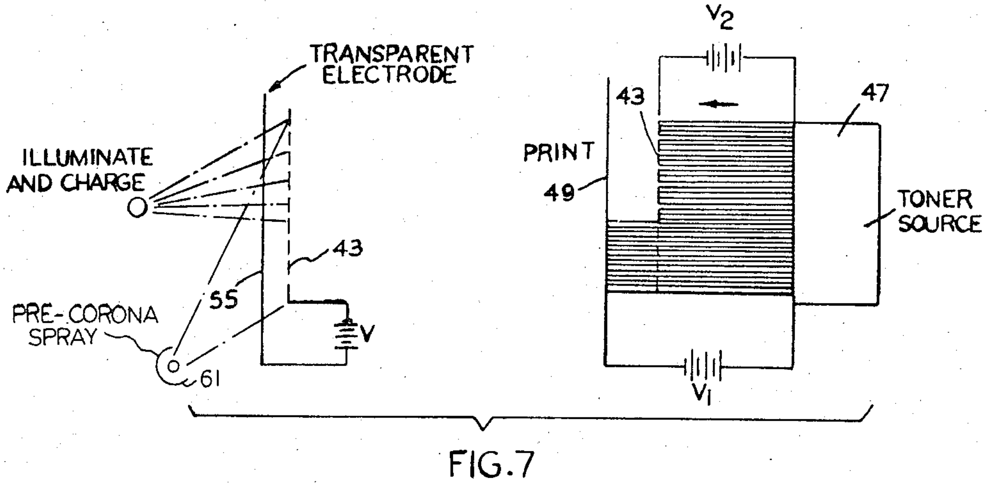
FIG. 7 is a schematic illustration of the processing steps for reproducing the light image in positive form, with and without the enhancing field.

By way of example, for suitable conventional materials, the screen may be charged by an applied field during exposure to the light image, as in FIG. 7. The illuminated areas of the screen photosensitive layer become conductive, and under the influence of the applied charging field, via transparent electrode 55, acquire a charge separation similar to that shown in FIG. 3. After the charge separation is formed, the illumination is removed, causing all parts of the screen photosensitive layer to become insulative. At this point the charging field may be removed and the portions of the screen which are illuminated would remain charged and thus block the passage of toner particles during the printing process. This technique produces positive reproduction of the light image.

In FIG. 7, the enhancing field may be added simply by providing the pre-corona spray from source 61. This is possible because screen 43 is of the double layer type capable of holding the double layer charge. While no source of potential is shown for corona source 61, it can be supplied by a positive or negative source, depending upon the type charged which is desired to appear on the photo conductor layer or screen 43.

FIGS. 12 through 16 later to be described, provide details of charging with a positive or negative enhancing field. However, in FIG. 7 it will be noted that the source 61 should induce charges on the screen opposite that of source V in order that the applied field V may overcome and reverse the enhancing field charge laydown in the areas illuminated.

Effective field blocking of toner particles requires a combination of high charge level and large insulator thickness. The range of photosensitive materials which may be used for the insulator layer can be extended by special screen configurations. If the desired insulator material 101 (FIG. **8*a*) has a low dielectric strength (thus limiting the amount of charge separation it can support) a thin undercoating 103 of a high dielectric strength (but not necessarily photoconductive) material can be used to separate the photosensitive layer from high field regions near the edge of the holes. The conductor 105 is affixed to the undercoating 103.**

Similarly, a thin overcoating 107 (FIG. **8*b***) of high resistivity material can be used to provide a charge carrier for photoconductors with poor surface resistivity.

For photoelectric materials that cannot be deposited in the heavy layers required for this purpose, the insulating layer may be formed of any good insulating material which will accept the sensitive material as thin deposit 109 (FIG. **8*c***). The entire screen, including portions of the conductive layer, may be coated.

It is computed that the form of the field within the hole is such that, if a hole is only partially charged (i.e., has not developed sufficient charge to block) the effect of the charge is to limit the aperture of the hole (FIG. 9) Partially charged holes are created by reduced exposure during discharge, as would occur in gray areas of the image. Thus, gray areas reproduce with reduced apparent aperture, forming a half-tone reproduction of a continuous tone source. The field lines are shown at 111 and the equipotential lines at 113.

In FIG. 10 the composite screen is shown at 121 supported by the four motor-driven drums 122 through 125. This screen 121 may take the form of any of the screens of FIG. 2, FIGS. **8*a*, 8*b*, and 8*c***.

An image station 130 includes a light source 131, image 132, and lens system 133, which directs the light through transparent electrode 134 and onto the screen 121. The transparent electrode 134 may be comprised of mylar with a conductive coating or of conductive glass. Thus, the selected charging voltage $+E_c$ or $-E_c$ is connected by lead 136 to electrode 134 and extends to common lead or ground 137. The conductive layer of screen 121 is grounded by drum 123 at fixed potential to complete the charging field and to fulfill its two functions, previously described.

The modulated image is moved to the printing station, generally designated at 140, where a toner supply of charged particles 141 is maintained at a toner potential $E_T$.

A revolving brush 143 is provided to agitate the toner material, facilitating its movement toward screen 121 under control of propulsion field $E_P$, and the apertures of the screen 121 control passage thereof onto the paper 145 to be printed. The propulsion field is provided by leads 147 and 149, the former of which extends to a roller 150 which is in contact with a continuous backing of paper carrying belt 153. Toner is supplied in powdered or atomized form over conduit 155 from a suitable source (not shown).

The charged particles which pass through screen 121 are deposited on the paper 145 in the form of a positive or negative image as hereinbefore explained and the paper passes under resistance heater 157, which fixes the image thereto, if necessary, and wedge 159 drops the printed paper into stack 161. The paper drive is taken from motor driven drum 163 which is synchronized with conveyor screen 121, preferably for intermittent motion to permit printing at station 140.

A vacuum scavenger is shown as conduit 170 provided to remove the marking particles or droplets from the conductor side of screen 140.

Propulsion field switch 148 is closed upon arrested motion of conveyor screen 140 and paper belt 153 to cause transfer across an air gap or in direct contact, if desired. Of course, if paper belt 153 and screen 140 are synchronized, provisions for interrupted motion are unnecessary.

The schematic arrangements of FIG. 10 may be built using components selected from the apparatus and control circuitry of U. S. Pat. No. 3,532,422 in the name of Samuel B. McFarlane, Jr., filed July 14, 1966, and entitled Method and Apparatus of Electrostatic Color Reproduction, assigned to the same assignee as the subject invention; with the exceptions, as depicted in FIG. 10, i.e., the screen 140, transparent electrode 134 and the various electrical fields herein described. Exposure and printing are preferably carried out with the conveyor intermittently stopped although exposure may be accomplished in line-by-line fashion on a continuous basis and printing done as above described. Similarly, sequential color reproduction may be achieved with the present invention, in accordance with the apparatus disclosed herein identified and as in the McFarlane patent.

Also, the apparatus of FIG. 10 is useful as shown for positive or negative reproductions. Moreover, if only negative reproductions are contemplated, a conventional corona discharge source may replace transparent electrode 134. All fields depicted are preferably direct (D.C.) potential fields.

With the foregoing in mind, it will be appreciated that the invention is preferably characterized by an insulating screen of sufficient thickness compared to hole diameter to produce a repulsive field within the holes when a double layer charge is modified in accordance with the image. The conductive layer, directly or indirectly connected to the insulator layer, provides charging of the insulator in this double form. The conductor layer, when maintained at a constant potential during printing, limits the discharging effect of the ink or toner particles by shielding the insulator screen and absorbing the charges of the particles. The propulsion field of sufficient magnitude propels the particles to the substrate or conductor, but has insufficient force to cause the particles to pass through charged areas of the screen. The holes which have less than sufficient charge to completely block the printing material act as holes of reduced aperture thereby permitting the reproduction of continuous tone gray scale, as in half-tone printing. Also, the use of multiple layer configurations has been described to protect photosensitive layers from excessive fields, as is the case when insulator layers are used to form the base for thin film photosensitive materials to obtain the charge separation distance.

Alternately, if charge neutralization is not a problem, the conductor layer may be used to establish a uniform field between the screen and receiving surface for accurate reproduction of the charge image, in which case the conductor layer faces the receiving surface.

By way of example, screens having from 80 to 1,000 lines per inch are effective for good reproduction. A screen with 200 lines per inch will reproduce as faithfully as present-day office machines and exhibits the characteristic that the edges of the reproduction are clearly and strongly outlined with little or no holidays, thereby enhancing the resolution available from this system.

It is, of course, desired that a maximum charge be carried by the insulator of the multi-layer grid so that good and strong control can be had at the individual apertures. It is for this reason that several modifications of the screen are present to encompass the conventional materials available today. The $T_1/D$ ratio is just as important as total charge in determining the blocking effectiveness. This ratio, of course, is limited by construction difficulties.

When using photosensitive materials in connection with the apparatus of FIG. 10, a light-tight box, indicated by the dotted line 200, is employed with suitable ingress and egress openings being provided.

It has also been determined that highly viscous mediums are desirable for the supply of toner material. The preferred gap for marking material transfer between screen and paper is of the order of 1/16 to 1/4 inch, but it should be noted that contact printing may also be achieved with the process of this invention. Toner particles of the order of 4 to 8 microns have been found to be operative within the teaching of this invention to provide the good edge effects which are readily achieved. Even smaller sizes are of course preferred. Contact printing on any medium can be achieved if the conductor layer faces the printed surface—otherwise only insulators may be printed in contact.

In FIG. 10, the insulator or dielectric material 165 enables improved performance in the field charging method, but requires at least light contact with the screen 121. This dielectric material may be selected from any number of suitable transparent dielectrics, such as mylar, epoxy, polystyrene, quartz and many others.

The enhancing field can readily be included in the arrangement of FIG. 10 through the provision of corona source 161, adapted to be connected over switch 163 to either the negative or positive enhancing voltage $E_E$. The appropriate charge level may be sprayed onto screen 121 from source 161 and by way of example, the magnitude of the enhancing field charge level may be of the order of 350–750 volts.

It is through the provision of source 161 that densities approaching 100% are provided for solid printed areas. This is readily understood from FIG. 11 where a particle path 199 illustrates the oversized entrance and exit openings produced electrically as a result of the enhancing field. Also, the provision of source 161 enables ready negative or positive printing with the arrangement of FIG. 10 as will be explained in the description of FIGS. 13–16.

First, however, FIG. 12 shows the improved field charging apparatus without the enhancing field. A transparent support 203 of glass or even pliable material is provided for thin conductor 205 and the insulator or dielectric 207, the latter corresponding to dielectric 165 of FIG. 10. The screen shown in detail in FIG. 12 includes the photoconductor layer 209 and the conductor layer 211.

FIGS. 13 through 16 show the structure used in the improved field contacting method and illustrate the application of both a positive and a negative enhancing field.

In FIG. 13, the blocking or enhancing field (depending upon the sign of the particles to be projected) is shown as the positive charges 213, uniformly covering the photoconductor 209. Screen 211 is grounded or held at a given potential level and the positive charges 213 provide the double-layer charging of photoconductor 209, when in the dark, due to its resistance.

FIG. 14 shows the image elements (203,205,207) in contact with the photoconductor 209 of the screen. Additional provision is made for connecting the applied field $E_C$ to the conductor layer 205 of the image elements and to the conductor layer 211 of the screen. The structure of FIG. 14 is shown after light, e.g., from an image (not shown) has been shined on the right hand side, as legended, but prior to application of the voltage $E_C$. Normally, for optimum charge transfer, contact would be established and then the image would be applied at the same time that the voltage $E_C$ is applied. The image would be turned off and the voltage maintained until the image elements are separated from the screen. However, in FIG. 14, it may be noted that the light simply reduces the resistance of the photoconductor 209 such that the charges in the light exposed area leak away. The magnitude of source $E_C$ exceeds the charge levels pre-charges 213, such that the reversed field (negative charges of FIG. 14) actually becomes the enhancing field for the positively charged marking particles 221 shown for effecting printing.

In FIG. 15, the effects of the applied voltage $E_C$ are seen as a reversed field in the light or print areas. The voltage $E_C$ should be as high as possible without breaking down the photoconductor and of course be commonsurate with other materials and their thicknesses. Preferably, this voltage will be about twice that of the precharges 213 which enabled enhancing in order that it may eliminate the pre-charge field and apply a reverse charge to the areas where the charge was eliminated. Thus, in FIG. 15, the force lines of the blocking, fringing or enhancing fields of the apertures were depicted. The positive printing material 219 is shown being deflected to the conductor 211 because the hole directly above is electrically blocked. However, particle 221 is permitted and aided to pass through the electrically unblocked and reversed aperture directly thereabove to print on the material (not shown) which would normally be adjacent to the propulsion field ($E_P$) backing member 217. Thus, for positive marking material, the enchancing field (charges 213) actually becomes the blocking field and the applied field ($E_C$) becomes the enhancing field.

The opposite situation prevails in FIG. 16, wherein the negative charge level 223 was laid down as the enhancing field and it was reversed by the applied field to the right of the printing area. Thus, it may be seen that the enhancing field enables passage of marking material 221, and of course actually assists or aids this material in it projection toward the material to be printed. It is this aiding or assisting due to the field force lines which funnels the printing material through the enhanced openings to provide the excellent printing densities achieved. The particle 219 cannot pass through the now blocked right hand apertures due to charges created by the applied field $E_C$.

Since the enhancing field can be either positive or negative and since the applied and propulsion fileds may be reversed, positive or negative printing can be obtained using either positively or negatively charged printing material. Thus, in FIG. 15 positive printing would be obtained if $E_P$ were reversed and negatively charged printing material used, the enhancing and applied fields remaining, as shown.

Other methods of charge image transfer may be employed with or without the enhancing field. For example, the insulation or dielectric layer 207 may be used per se, to carry a charge in accordance with the image. One such charge pattern would be an electrostatic latent image. Without the enhancing field, the electrostatic latent image charge would simply be transferred to an insulator in the position of element 209. To incorporate the enhancing field, the insulator 209 could be precharged with the enhancing field level and the electrostatic latent image would then overcome and reverse the precharge in the image areas to operate in the same manner as depicted in FIGS. 15 and 16.

A continuous type printer is shown in FIG. 17 and it could simply replace the left hand end of the apparatus of FIG. 10. The light-tight box 200' houses the screen 121' carried on rollers 124' and 125'. However, additional rollers 127 and 129 are provided to cause the screen 121' to snugly fit against the transparent insulator or dielectric 165' overlaying transparent conductor 205', in turn supported by transparent support 203'. The applied voltage field $E_C$ is connected to a brush or slider contact 229 for transparent conductor 211 of screen 121'.

Conventional optics are shown at 225 simply to provide line by line scanning of a positive or negative to be reproduced. The scanning is of course synchronized with the movement of the screen 121'. Switch 163' permits corona source 161' to supply a positive or negative enhancing field, as explained previously.

In FIG. 16*a* there is shown a polarity chart to indicate the proper polarity for the voltage $E_C$ and voltage $E_E$ for printing with positive particles and for printing with negative particles, it being understood that these voltages are switched together in accordance with this chart. The chart is applicable to the device of FIG. 10, the arrangement of FIGS. 13 through 16, and the apparatus of FIG. 17, it being apparent that in FIG. 13 the charge 213 corresponds to voltage $E_E$. Thus, referring to the chart, when both voltages $E_C$ and $E_E$ are positive, negative printing is produced when using positive particles and positive printing is produced when using negative particles. When the polarity of voltages $E_C$ and $E_E$ is negative, then positive printing is produced by using positive particles and negative printing is produced by using negative particles.

FIGS. 18 through 26 illustrate arrangements for establishing charge patterns directly on the screen means with and without enhancing fields, and using either a dielectric or insulative layer, as well as a photoconductor layer.

In FIG. 18, an electrostatic latent image is shown in the form of the negative charges carried by a dielectric or insulator layer 253 backed by a conductive lyaer 251. It is desired to charge the screen comprising the insulator layer 255 and the conductor layer 257 to the charge pattern corresponding to the electrostatic latent image.

In FIG. 19, the charge-carrying elements are brought together with the screen either in proximity or contact such that the electrostatic latent image is transferred to double-charge the insulator layer 255 of the screen by closure of 261 to apply voltage from transfer source $E_T$ shown at 259.

In FIG. 20, the elements are shown apart with insulator layer 255 of the screen being charged in accorance with the electrostatic latent image.

in FIGS. 21 through 23, the same type charging is carried out except that a precharge has been applied to the insulator layer 255 of the screen to take advantage of the enhancing field approach previously described. From FIG. 23, it will be seen that the transfer charges of the electrostatic latent image overcome and reverse the precharge in the areas of the electrostatic latent image, whereas the precharge remains undisturbed in the other areas.

In FIGS. 24 through 26, a conventional xerographic plate is shown comprising photoconductive layer 263 and conductive backing layer 251. The electrostatic latent image is transferred in FIG. 25 by application of transfer source $E_T$ to produce the charged screen of FIG. 26. It will be appreciated, of course, that the enhancing field approach is equally applicable to the xerographic plate, from a review of the description of FIGS. 21 through 23.

FIG. 27 shows the apparatus and its arrangement for putting electrostatic charge images on the insulator coated screen by contact charging. The contact charging plate consists of a transparent support 303 which carries a transparent conductive coating 305 and a photoconductive coating 307. During the charging operation, this contact charging plate is placed in direct contact with the screen which consists of an insulator layer 309 and a conductive backing 311. A charging voltage 315 is applied between the transparent conductive coating 305 of the contact charging plate and conductive backing 311 of the screen.

FIG. 28 shows the contact charging plate and the screen just prior to contact. At this point, the screen insulator layer 309 is uncharged.

In FIG. 29 the contact charging plate is placed in direct contact with the insulator layer of the screen and the charging voltage $E_C$ (shown at 315) is applied between the conductive coating 305 of the charging plate and conductive backing 311 of the screen. A light image is then projected through the transparent support 303 and transparent conductor 305, exposing the photoconductive layer which becomes conductive in those areas struck by light. This permits charge to accumulate at the interface between the conductive layer 309 of the screen and the surface of the charging plate. These charges accumulate only in those areas illuminated by the image in amounts proportional to the intensity of the illumination. The contact charging plate is then removed from the surface of the screen and the accumulated charges remain as shown in FIG. 30.

The polarity of charge shown in FIG. 30 will produce blocking fields for negative particles 321 which will not pass through the highly illuminated areas but particles 319 will pass through the dark areas of the image, thus producing direct positive printing. Alternatively, as shown in FIG. 31, positive particles 319 may be blocked by reversing the charge potential $E_C$. thereby applying positive charges on the surface of the screen in the illuminated areas. Positive particles 321 pass throug the unilluminated areas to print.

In FIG. 32, the screen is shown as being precharged with charge levels indicated at 313. The contact charging plate is then placed in contact with the screen as shown in FIG. 33. The light image is projected through the transparent support 303 and transparent conductor plate 305. During this exposure, the conductive backing 305 of the contact charging plate is connected by means of connection or short 310 to the conductive backing 311 of the screen. The illuminated portions of the image falling on the photoconductor 307 cause discharge of the previously charged areas of the screen in the illuminated areas. The photoconductive plate is then removed from the surface of the screen and the charges which remain on the screen correspond to the dark areas of the original image.

In FIG. 34 there is shown how these charges block particles 319 of positive sign. But the particles 221 will pass through the holes corresponding to the illuminated areas of the image, thus producing a negative print. Propulsion field $E_P$ encompasses the screen and usually the print receiving medium would be disposed in the space between the screen and boundary plate 317.

In FIG. 35, it is shown that with a reversed polarity of the pre-charge 323 i.e., negative charge 323, negative particles may also be used in the same manner.

In FIG. 36, the screen is again shown with the precharge 313 prior to contact with the contact charging plate.

In FIG. 37, the contact charging plate is placed in contact with the insulator layer 309 of the screen and a light image is projected through the transparent portions of the contact plate to photoconductor 307. A charging potential $E_C$ is applied between the conductive coating 305 of the charging plate and conductive backing 311 of the screen. In those areas of light image which illuminate the photoconductor, the charging voltage $E_C$ reverses the applied precharge by causing an accumulation of charges in he interfrace between the photoconductive layer and insulator layer. The contact charging plate is then removed from the surface of the screen, allowing both the original precharge (which remains in the unilluminated portions of the image) and the accumulated charge which appears in the illuminated portion of the image, to remain on the surface of the screen.

Thus, looking at FIG. 38, there is shown the polarity of charges which will produce negative printing with positive particles. Particles 321 will pass in the illuminated areas and their passage is enchanced by the forward fields in this region. By the same token, particles such as 319 will not pass through the screen because of the reverse fields which provide even further control over the concept using fields from only zero to plus or zero to minus.

In FIG. 39 the polarity of the precharge 232 is shown reversed as well as the polarity of the charging potential $E_C$. Therefore, for positive particles, such as 321, positive printing is permitted because they pass through areas corresponding to the dark portions of the image.

It has been found that in employing the direct contact charging plate, some pressure between the screen and the contact plate is desirable. Also by way of example, the precharge potential may be of the order 100 to 300 volts and the charging potential $E_C$ in the order of 700 to 1,000 volts which produces on the screen surface resulting potential upward from 100 to 300 vols of opposite polarity of that of the precharged potentials. It is not necessary that maximum forward and the maximum reverse fields be of equivalent magnitude. In partially illuminated areas, fields will vary in intensity between maximum forward and maximum reverse levels. The advantages of contact charging are that the charging image is produced on an insulated surface which can be of very high quality, and which is generally easier to apply to screens that photoconductive coatings, and which also can support the charge image for long periods of time extending into many hours; and it is compatible with both image charging as well as modification of precharge; and the ability by selection of potential polarity to produce either direct positive or negative reproduction of the image as deomonstarted in FIG. 40.

In FIG. 40, method A refers to direct image charging without precharge. Method B refers to the use of precharge only with a direct connection between charging plate and screen during exposure, thus producing modification of precharge. Method C refers to the combination of both a precharge and a charging voltage to provide enhancing field capability. In FIG. 40 $e_C$ refers to the polarity of the charging potentials while $E_E$ refers to the polarity of the precharge on the screen. From the table, it may be seen that either positive or negative printing may be achieved depending on the polarity selected for $E_E$ and $E_C$.

In the apparatus of FIG. 41, contact charging is applied to the equipment in FIG. 10 and, therefore, only the distinctions will be described. First, an insulator coated screen is used instead of a photoconductive screen. Dielectric 165 is replaced by photoconductor 165''. Also the polarity of charging potential $E_C$ is reversed with respect to the precharge potential $E_E$. Polarity $E_P$ is selected according to the sign of the charged particles used for printing. Similarly, FIG. 42 shows the equipment of FIG. 17 incorporating contact charging. The changes are that dielectric 165' is replaced by photoconductor 165'' and polarity of charging potential $E_C$ is reversed with respect to the precharge $E_E$ and the screen is an insulator coated screen.

In FIGS. 43 through 47 there are shown the incorporation of the screen in a camera modification for the reproduction of illuminated scenes. The camera 401 comprises a light-tight box with conventional lens 403 to form an image of the scene to be photographed through shutter 405, onto contact charging plate 407. However, prior to exposure or operation of shutter 405 the screen 409 is brought into contact with the contact plate 407 which plate may comprise the elements heretofore described, such as the photoconductor 406 and transparent electrode 408. The clamps 415 are provided for snugly fitting the screen 409 against photoconductor 406. The combination removable screen 409 and contact charging plate 407 along with charging potential $E_C$ permit charging of the screen 409 upon exposure, thus producing a charge image on the screen surface corresponding to the image thereby photographed.

After exposure, the screen is removed from the back of camera 401 and placed in a toning device (FIG. 45) which provides the desired development.

In FIG. 45, it is desired to project toner from toner source 410 (which may be by a conventional toner source) to ordinary paper of other print-receiving material shown at 412 through the charged screen 409. Thus, a propulsion field $E_P$ is shown between a boundary conductive plate 413 and ground. It should be pointed out that the source of voltage for $E_P$, while shown as a battery, would normally comprise an adjustable source such as a potentiometer or in certain applications it may comprise sources of alternating voltages. But in any event, throughout the various embodiment of this invention, it would be understood that all sources may be variable for better control of the quality of printing. This, of course, is true of the potential $E_S$ applied to the screen 409. By adjusting these potentials and by controlling the length of time of projection of toner particles, some quality control of tonal variations may be had.

It should be noted that field charging may be applied to this camera by replacing the photoconductor 406 with a dielectric transparent insulator and using a photoconductor coating on screen 409. However, the arrangements shown using an insulator layer on screen 409 is preferred because the charge image on the screen is not light sensitive and development may be delayed for several hours. But either type screen will provide many copies. However, processing need not be so rapidly accomplished when using the insulative screen.

FIGS. 46 and 47 illustrate an arrangement for incorporating the enhancing field level into the camera by permitting reversal of the charging potential $E_C$ and by synchronizing internal lights 420 and the shutter opening with $E_C$ by way of a conventional timer 421. The light flooding produced by internal lamps 420 during application of (for example) positive $E_C$ produces the uniform precharge needed for the enhancing field. The exposure during the negative cycle of $E_C$ as shwon in FIG. 47 modifies (diminishes and even reverses) the precharge in the illuminated areas of the image, producing the required charge distribution for the enhancing and blocking field actions. In FIG. 47 the preferred timing sequence is shown as first applying $E_C$, then turning on lamps 420 for the period corresponding to the time interval 430, then reversing $E_C$, and then opening the shutter for the time interval 431.

In FIG. 48 there is shown computer print-out apparatus capable of providing single or multiple copies simultaneously. The conveyor preferrably comprises the double layer screen 501 arrangement in endless fashion. A corona source 503 is shown as the apparatus for producing precharge from potential level $E_E$. The computer readout is made available to image station 505 for modulating the screen 501 either with or without the precharge. Printing is accomplished at one or more of a desired number of printing stations herein shown as four stations. An endless source of paper 507 or other receiving material is shown opposite a toner source 508 at each station. The screen 501, tonor source 508, and receiving paper 507 may operate in a continuous high-speed manner to affect rapid printout. A vacuum system comprising main exhaust conduit 510 and upright conduits such as 511 are provided to clean toner from the conductive side of the screen.

One suitable image station is shown in FIG. 40 as comprising cathode ray display tube 512 with optics 514 for imaging the computer output information onto screen 501. For field charging or xerographic charging of screen 501, the outer layer would comprise a photoconductor whereas for contact charging the outer layer of screen 501 would be an insulator other than a photoconductor.

In FIG. 50, there is shown an alternative arrangement for image station 505. This comprises a direct writing cathode ray tube 520 charge modulating screen 501 using the insulative layer thereof. Thus, it may be seen that essentially simultaneous multiple copies of the computer output may be printed on ordinary paper.

In FIG. 51 a facsimile readout system is depicted wherein the charge pattern is laid down by charging stylus 601; thus, in this case, the pattern to be reproduced is in the form of the electrical signals received throughout the facsimile transmission line and the charging varies in intensity in proportion to the electrical signals received at stylus 601. While the stylus could be shown traversing a flat screen, the embodiment is illustrated using a drum 603. However, the drum is comprised of the screen mounted for rotation such that the stylus may completely scan the drum 603 to produce the charge image. In this case, the outer surface of drum 603 would be the insulative layer 605 of the screen.

Print-out is affected by bringing the paper 607 to be printed, as by conveyor 608, opposite the toner source 610. The toner particles pass through the charged screen 603 to paper 607, and where necessary fixing may be accomplished at station 615.

In FIG. 52, there is shown an embodiment of the invention comprising an electrostatic typewriter which may be of the silent operating type, if desired. In the preferred embodiment an insulator coated screen 701 is shown in the form of a cylindrical drum 703 mounted for rotation. A character wheel 705, which alternatively might comprise a ball or other array, includes the characters, such as 707, with the purpose being to write the charge image of the characters on the screen 701 by bringing the selected characters 707 into slight contact with the screen 701 or into proximity therewith.

The keyboard 709 may comrpise more or less standard typewriter keys 711, and depression of a selected key 711 merely brings the corresponding character on wheel or ball 705 into printing position, shown as 713, to write on screen 701.

At first the screen is uniformly precharged by means of corona source 729 in conjunction with potential $E_E$. This precharge provides a uniform overall blocking field on the screen. A charging pulse $E_C$ is applied through timer 731 between the selected character of wheel 706 and the conductive backing of screen 701 through slider or roller 716, producing a charge image in the shape of the character on the surface of screen 701. When a page of typing is completed, paper 723, which may be ordinary office stationery, is carried by conveyor 721 into priximity with the screen to the paper. The image is then fixed at station 727. Multiple copies can then be produced of this page without retyping. Additional paper is brought up and the printing cycle or rotation of the drum is repeated.

An alternate arrangement for the print wheel is one in which the print wheel is a continuously rotating member and selection of a character on the keyboard merely selects the appropriate time interval for the pulse $E_C$, such that the pulse occurs only at the time the selected character is facing the screen.

The print wheel may have an erase position which consists merely of a flat raised surface slightly larger than the largest character printed. When local erasure is desired, the drum and wheel are indexed to the desired character position and the erase element of the character wheel is placed in slight contact with the screen. Then a pulse of reversed charging voltage ($-E_C$) is applied which removes the existing charge image at that character location. A new character may then be entered in that location if desired.

A selector may be included on the keyboard which permits the selection of varying degrees of intensity of the typing by essentially varying $E_C$ which controls the intensity of the charge placed onto the drum by the character. Thus, it would be possible to obtain boldface and lightface typing from the same machine without changing the typewheel.

In the ion type printer of FIG. 53, there is shown a first conveyor 811 of the double layer type. It comprises an insulative, or photoconductive, screen layer 813 and a conductive screen layer 815.

A detailed showing of a portion of the conveyor is shown in FIG. 53*a*, wherein it is seen that the corona source or Corotron 817 projects negative ions onto the insulative layer 813, which ions cause the double charge to appear across the insulator 813. The source $E_1$ is a direct current source of conventional nature, and the proximity of the discharge wire of the corona source to the conveyor 811 determines the preferred potential, which may be in the range of 3,000 to 5,000 volts or higher.

FIG. 53 illustrates the application of the principles hereof to ion projection as well as the combined use of different types of charged particles.

The charged conveyor moves to the scanner station wherein a conventional scanner 819 is provided to project image light via lens 821 onto the conveyor 811. This may be done in line-by-line fashion or image-by-image fashion, particularly for intermittent movement. The charge on the conveyor 811 is not dissipated until the light shines on the photoconductor 813 to lower its resistance, the unit being within light-tight housing 825 provided with an access for the original of the image 827 to be reproduced in known fashion. Where the light impinges, however, the charge is dissipated, as is also represented in FIG. 53a by the bracket bearing the legend "Light."

The conveyor 811 is then moved past further Corotron or corona source 831 which sprays negative ions, generated by source $E_2$, toward the now exposed (image) areas. As can be seen in FIG. 53, the ions, such as 835, move through the exposed apertures, such as 837, but the ions 839 in the regions of the unexposed apertures 841 are blocked due to the fringing field in those unexposed apertures; therefore, the second conveyor 851, which may be identical to conveyor 811, receives a double layer charge in the regions of light exposure.

However, conveyor 851 has been precharged with a uniform potential level for enhancing provided by corona discharge source 850. This is represented in FIG. 53*b* wherein the insulator 853 (which need not be photoconductive) is sprayed with negative ions and the conductive screen layer 855 permits the double layer to be produced. Thus, in FIG. 53b the negative ions, such as 857, will pass through apertures, such as 859, in the uncharged regions and through partially blocked or enhanced regions and the ions, such as 861, are blocked in the regions, containing blocking fields, such as aperture 863. It may be seen that a particle may be either ion or powdered marking material, as will be apparent from the description of FIG. 54.

The negative ion source 865, which is at a d.c. potential $E_3$, may correspond to the negative ion sources 817 and 831. Alternatively, the sources 831 and 865 may comprise banks of Corotrons at potentials up to 8,000 volts d.c. for spraying entire images at once. Corona source 850 removes any image charge that may have existed on belt 851.

The negative ions, such as 857, passing through the regions (apertures 859) produce a charge pattern on print-receiving material 867 carried by an ordinary conveyor 869. The print-receiving material 867 preferably has a thin insulative coating in order that the charge pattern will not dissipate. The paper 867 is then conveyed under a conventional powdering source 871, which includes the charged marking material 873, charged by revolving brush 857 connected to the positive source $E_4$. Thereafter, the printing material 873 adhering to the charged pattern on paper 867 is fixed by heat source 877 and then removed from the light-tight housing 875 by wedge 879.

The conveyors 811, 851, and 869 may be at potentials other than ground to aid in propelling the ions across the air gaps or the powder to the substrate.

In FIG. 54 the ion principle is employed with powder projection across an air gap to reproduce on ordinary paper. The first conveyor 901 is charged by ion projection from Corotron 903, powered by source $E_1'$. The scanner 905 exposes conveyor 901 within the light-tight housing 907. Scanner 905 may have a door or slot 909 through which the original to be reproduced is inserted.

In FIG. 54*a*, the charged and exposed conveyor 901 is shown in detail as comprising photoconductor 911 and conductive backing 913. Where the photoconductor 911 is exposed is indicated by the legend "Light." Here the fringing fields have been eliminated, as at aperture 915. In the dark regions (indicated by aperture 917), however, the blocking fields remain.

Thus, when the conveyor reaches Corotron or ion source 919, powered by d.c. source $E_2'$, the negative ions emitted, such as 921 (FIG. 54a), can only pass through the exposed apertures, indicated at 915, and pass through partially blocked apertures, in fewer numbers.

In the manner hereinbefore explained, the second conveyor 925 (which has been precharged to an enhancing field level by corona 926) is sprayed with negative ions across the air gap wherein the ions can only pass proportionately with the light regions of the original image. Thus, conveyor 925 becomes an electrostatic modulated control with both enhancing and blocking fields in varying degrees for the powder or marking material source 931. The powder is charged negatively by source $E_5$ and a particular powder particle 933 is shown passing through aperture 935 corresponding to the dark region of the original image, which aperture has been unblocked and contains an enhancing field. Aperture 937 is blocked in the light region and so prevents powder passage to the ordinary paper 939 carried by ordinary conveyor 941. Heat fixing means 943 is depicted, and the conveyor exits from housing 907 with the image reproduced thereon. Insulator screens may be incorporated in conveyors 901 and 811 through the use of field charging or contact charging as described herein.

Again the fundamental principles of this invention can be employed to make a photographic projection printer (often called an enlarger) incorporating either the modifications of a precharge of the direct image charging approach, as well as incorporating or not the enhancing field and using either the contact charging plate, field charging arrangement, or xerographic charging. A projection printing apparatus 1001 (FIG. 55) such as normally used for photographic purposes is also used in this invention, with the exception that the silver halide photographic materials and chemicals are not required. The image may be projected onto a precharged photoconductive coated screen 1003(FIG. 55) thus producing a charge image by selective discharging of the illuminated portions of the screen, or an insulative screen 1003' (FIG. 56) may be used in conjunction with the contact charging arrangement or the photoconductor screen may be used in conjunction with the field charging arrangement. The enhancing field may be incorporated in the latter two systems simply by applying a uniform precharge $E_E$ to the screen prior to placing in contact with the contact charging or field charging plate 1005 (FIG. 56). After the charge image is produced on the screen by one of the above methods, the screen is removed to a development apparatus (FIG. 57) which projects toner from supply 1010 through the screen onto the print receiving medium 1012 in accordance with the image formed on the screen when hinged supporting electrode 1015 is down. Alternately, the development apparatus may be a part of a single unit device (FIG. 58) such that removal of the screen to a separate development apparatus is not required. This device may also provide for placing a contact charging or field charging plate 1005' (if used) against screen 1003. After the charge image has been created on the screen, the receiving medium 1012 and propulsion field producing electrode 1015' are brought into position over the screen; the toner supply 1010 is then activated to produce the print. Many prints may be made from one exposure and a degree of control of print density and contrast is possible during the development stage. As discussed earlier, the direct positive or negative reproduction can be accomplished.

In FIG. 59, it is shown how an insulator screen 1101, per so may also be charged with the double layer charge through the use of double corona sources 1102 and 1103. Corona source 1102 charges one side of the screen with negative charges, corona source 1103 produces substantially equal and opposite charges on the opposite side of the screen. These charges may then be modified to produce the required charge image.

FIG. 60 shows another approach for producing the double-layer charge in the form of an image onto screen 1101, which is insulator, per se. The screen 1101 is sandwiched between conductor backing sheet 1111 and a contact charging plate consisting of transparent support 1105, transparent conductor 1107, and photoconductor coating 1109. The light image is projected onto the photoconductor layer through the transparent support and conductor as in the manner of contact charging previously described. During exposure, a charging potential $E_C$ is supplied between the conductive backing plate 1111 and the conductive transparent coating 1107. Thus, substantially equal and opposite charges in the form of a light image are deposited onto the insulator screen 1101.

Other approaches for charging the insulator per se screen include writing on the screen surface by means of a conductor stylus or through the use of another multilayer aperture control screen containing a charge image, as in the case of the ion projection system previously described.

It should be noted that the screens described herein are not limited to any given shape, size, or distribution of apertures and may even contain apertures of varying size and/or shape and/or distribution even in a random fashion as shown in FIG. 61. In screen 1201 (FIG. 61*a*), apertures 1203 are distributed in a random fashion and may have randomly distributed size and irregular shape as well. Alternately, the screen 1205 (FIG. 61*b*) may consist of the uniform array of circular apertures 1207 in essentially a square or 90 degree pattern. Alternately, the apertures 1211 as shown in screen 1209 (FIG. 61*c*) may be circular, arrayed in a uniform pattern of a triangular or 60° distribution. Alternately, as in screen 1213 (FIG. 61*d*) the apertures 1215 may be square and arrayed in a square or 90° pattern, or as in screen 1217 (FIG. 61*e*) the apertures may consist of triangular holes 1219 arrayed in a triangular pattern, or as in screen 1221 (FIG. 61*f*) the apertures may consist of hexagonal holes 1223 arranged in a hexagonal pattern. It is also possible as indicated in screen 1229 (FIG. 61*g*) that the screen be composed of a distribution of wires which may be woven into a mesh as indicated in FIG. 61*h* in which wires 1231 and 1233 are interwoven to provide a woven wire screen, and as shown in FIG. 61*i*, the coatigs 1235 required for these wires to provide the multilayer screen are disposed on one side of the wire.

Various combinations and modifications of the apparatus herein disclosed may be made following the principles of the invention. For example, the screens may be stacked or comprise repetitive layers to increase the fields. Charge patterns may be directly transferred from one screen to another. The ion printer may comprise a positive or negative printer using only a single belt or screen if contact or field charging is employed. In FIG. 53, for example, precharge source $E_1$ may apply a negative precharge. Then scanner 819 could operate through a field charging plate to modify and reverse the fields in the light impinged areas. If source $E_2$ provided positive particles, printing could be achieved in positive manner on paper disposed oppositely of source $E_2$ relative to conveyor 813. Negative particles would produce negative printing.

What is claimed is:

1. The method of electrostatic computer print-out employing charged particles for printing comprising the steps of:

pre-charging a multi-layered apertured carrier having an apertured conductive layer and a coinciding apertured overlaying insulative layer capable of supporting charge potentials of differing magnitude for establishing electrostatic lines of force within the apertures of the carrier for controlling the passage of said charged particles in accordance with the patterns to be printed, to establish substantially uniform electrostatic lines of force within said apertures;

disposing at least one print receiving medium spaced from the carrier at a location therealong;

modifying the substantially uniform electrostatic lines of force across the insulative layer in accordance with the computer output information to be printed;

establishing relative motion between the carrier and the print receiving medium causing the electrostatic patterns to traverse the printing medium; and, directing the charged printing particles toward the printing medium via the carrier for modulation in accordance with said electrostatic patterns to print the computer output information on said print receiving medium.

2. The method of claim 1 for printing multiple copies of the computer output information comprising the further step of:

disposing further print receiving mediums adjacent to the carrier in spaced apart relation with said print receiving medium; and, projecting charged printing particles toward each of the further printing mediums via the carrier for modulation in accordance with said electrostatic patterns, sequentially to print said computer output information on each of said mediums, essentially simultaneously.

3. An apertured controlled electrostatic computer print-out apparatus employing charged particles for printing in accordance with desired patterns to be printed comprising, multi-layered apertured carrier means comprising an apertured conductive layer and a coinciding apertured overlaying insulative layer capable of supporting charge potentials of differing magnitude for establishing electrostatic lines of force within the apertures of the carrier means for controlling passage of said particles in accordance with the patterns to be printed;

means for supporting and positioning at least one print receiving medium spaced from the carrier means at a location therealong;

means for pre-charging the insulative layer to a substantially uniform level establishing uniform distribution of electrostatic lines of force within said apertures;

means for creating electrostatic patterns across the insulative layer in accordance with patterns of computer output information comprising a source of potential having a magnitude exceeding the precharge level and electrically polarized oppositely thereof to diminish, cancel, and reverse the electrostatic lines of force established by said means for pre-charging, selectively in accordance with said computer output information patterns:

means for establishing relative motion between the carrier means and the respective print receiving mediums to cause the electrostatic patterns to traverse the respective print receiving mediums sequentially; and, means for projecting charged printing particles toward the print receiving medium via the carrier means for modulation in accordance with said electrostatic patterns to print said patterns of computer output information on said print receiving medium.

4. The apparatus of claim 3 wherein said means for creating patterns comprise a cathode ray tube and optical means for focusing computer output information displayed on the cathode ray tube onto the pre-charged insulative layer;

said insulative layer characterized by being light sensitive.

5. The apparatus of claim 3 wherein said means for creating patterns comprises a direct reading cathode ray tube disposed adjacent the insulative layer of said carrier means for applying electrostatic charge patterns directly to the insulative layer to diminish, cancel, and reverse the electrostatic lines of force established by said means for pre-charging, selectively in accordance with said computer output information patterns.

6. The apparatus of claim 3 for printing a plurality of identical copies of the computer output information further comprising a plurality of said means for supporting and positioning at least one print receiving medium spaced from the carrier means at a plurality of respectively spaced apart locations therealong; and a plurality of means for projecting charged printing particles toward the print receiving mediums respectively via the carrier means for modulation in accordance with said electrostatic patterns to print said patterns of computer output information on each of said print receiving mediums sequentially throughout the plurality of print receiving mediums.

7. A multi-copy aperture controlled electrostatic computer print-out apparatus employing charged particles for printing in accordance with desired patterns to be printed comprising, multi-layered apertured carrier means comprising an apertured conductive layer and a coinciding apertured overlaying insulative layer capable of supporting charge potentials of differing magnitude for establishing electrostatic lines of force within the apertures of the carrier means for controlling passage of said charged particles in accordance with the patterns to be printed;

means for supporting and positioning a plurality of print receiving mediums spaced from the carrier means at spaced apart locations therealong;

means for creating patterns of electrostatic lines of force across the insulative layer in accordance with patterns of computer output information to be printed;

means for establishing relative motion between the carrier means and the respective print receiving mediums to cause the electrostatic patterns to traverse the respective print receiving mediums sequentially; and, means for projecting charged printing particles toward each of the print receiving mediums via the carrier means for modulation in accordance with said electrostatic patterns to print said patterns of computer output information on each of said print receiving mediums, essentially simultaneously.

8. The apparatus of claim 7 wherein said means for creating patterns comprises a direct reading cathode ray tube disposed adjacent the insulative layer of said carrier means for applying the electrostatic charge patterns directly to the insulative layer; said insulative layer characterized by substantially light insensitive insulation.

9. The apparatus of claim 7 comprising vacuum means disposed adjacent the conductive layer of said carrier means at spaced apart locations relative to the print receiving medium to remove unused printing particles from the carrier means.

10. The apparatus of claim 7 further comprising means for pre-charging the insulative layer to a substantially uniform level establishing uniform distribution of electrostatic lines of force within said apertures;

said means for creating patterns in accordance with the computer output information comprising a source of potential having a magnitude exceeding the pre-charge level and oriented oppositely thereof to diminish, cancel, and reverse the electrostatic lines of force established by said means for pre-charging, selectively in accordance with said computer output information.

11. The apparatus of claim 10 wherein said means for creating patterns comprise a cathode ray tube, and optical means for focusing computer output information displayed on the cathode ray tube onto the pre-charged insulative layer; said insulative layer characterized by substantially light-sensitive insulation.

* * * * *